(12) United States Patent
Kulkarni et al.

(10) Patent No.: US 12,081,158 B2
(45) Date of Patent: Sep. 3, 2024

(54) METHOD FOR DETERMINING A POSITION OF A ROTOR AT STANDSTILL

(71) Applicant: TEXAS INSTRUMENTS INCORPORATED, Dallas, TX (US)

(72) Inventors: Prasad Kulkarni, Bengaluru (IN); Sameer Pradeep Kulkarni, Bangalore (IN); Venkata Pavan Mahankali, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 166 days.

(21) Appl. No.: 17/363,646

(22) Filed: Jun. 30, 2021

(65) Prior Publication Data

US 2023/0006575 A1   Jan. 5, 2023

(51) Int. Cl.
*H02P 6/18* (2016.01)

(52) U.S. Cl.
CPC .......... *H02P 6/181* (2013.01); *H02P 2203/03* (2013.01)

(58) Field of Classification Search
CPC ....... H02P 6/183; H02P 6/181; H02P 2203/03
USPC ................................... 318/400.06
See application file for complete search history.

(56) References Cited

U.S. PATENT DOCUMENTS

| | | | | |
|---|---|---|---|---|
| 5,280,222 A | * | 1/1994 | von der Heide | H02P 25/089 318/400.04 |
| 8,400,086 B2 | | 3/2013 | Cheng | |
| 2008/0129243 A1 | * | 6/2008 | Nashiki | H02K 3/28 318/701 |
| 2010/0181952 A1 | * | 7/2010 | Cheng | H02P 6/18 318/400.33 |
| 2010/0225262 A1 | * | 9/2010 | Matsuo | H02P 6/185 318/400.33 |
| 2011/0241658 A1 | * | 10/2011 | Vollmer | H02P 1/46 324/207.25 |
| 2019/0305697 A1 | * | 10/2019 | Slater | H02P 25/08 |
| 2020/0127587 A1 | * | 4/2020 | Roemmelmayer | H02P 6/18 |
| 2021/0111647 A1 | * | 4/2021 | Kalygin | H02P 21/22 |

OTHER PUBLICATIONS

Han, Wang; "Simulation Model Development of Electric Motor and Controller"; Chalmers University of Technology; Masters Thesis in Systems, Controls, and Mechanics; Gothenburg, Sweden; 2017.

(Continued)

*Primary Examiner* — Gabriel Agared
(74) *Attorney, Agent, or Firm* — Valerie M. Davis; Frank D. Cimino

(57) ABSTRACT

A method for determining a position of a rotor of a brushless direct current (BLDC) motor at standstill. The method includes providing a plurality of current pulses to a plurality of windings of the BLDC motor while the rotor of the BLDC motor is at a standstill position. The method further includes measuring a plurality of times that it takes for the plurality of current pulses to reach a threshold for respective ones of the plurality of windings. A first position corresponding to a shortest time of the plurality of times is determined. A position detection value is determined based on the shortest time and based on times corresponding to positions that are adjacent to the first position. A position of the rotor at the standstill position is determined based on the position detection value and an interpolation function.

19 Claims, 14 Drawing Sheets

(56) References Cited

OTHER PUBLICATIONS

Krushal; "Integrated Intelligence part 3: motor startup from standstill position"; Technical Article; TI E2E support forums; Dec. 11, 2017.
Lu, Yisong; "Start your brushless DC journey with motor startup (Part I)"; Technical Article; TI E2E support forums; Nov. 20, 2014.
Lu, Yisong; "Start your BLDC journey with motor startup (Part II): Choosing your parameters"; Technical Article; TI E2E support forums; Dec. 19, 2014.
Lu, Yisong; "Start your BLDC journey with motor startup (Part III): Initial position detection (IPD)"; Technical Article; TI E2E support forums; Feb. 19, 2015.

\* cited by examiner

METHOD FOR DETERMINING A POSITION OF A ROTOR AT STANDSTILL

BACKGROUND

Electric motors include a rotor and a stator having a plurality of windings. Brushless direct current (BLDC) motors are electronically commutated, wherein solid-state switching replaces the brushes and segmented commutators of traditional permanent magnet DC motors. In some BLDC motors, the rotor is or includes a permanent magnet. These permanent magnet BLDC motors operate by sequentially energizing the windings to attract or repel the permanent magnet rotor into rotational motion. Sensor-less BLDC motors often rely on back electromotive force (BEMF) detection to determine the position of the permanent magnet rotor.

SUMMARY

In one example, a method for determining a position of a rotor of a BLDC motor at standstill comprises providing a plurality of current pulses to a plurality of windings of the BLDC motor while the rotor of the BLDC motor is at a standstill position. The method further comprises measuring a plurality of times that it takes for the plurality of current pulses to reach a threshold for respective ones of the plurality of windings. A first position corresponding to a shortest time of the plurality of times is determined. A position detection value is determined based on the shortest time and based on times corresponding to positions that are adjacent to the first position. The position of the rotor at the standstill position is determined based on the position detection value and an interpolation function. For example, the interpolation function uses the position detection value to calculate an angular adjustment value, which can be added to the first position to achieve a position of a rotor of the BLDC motor at standstill that has a greater accuracy than the first position.

In one example, a method for determining an angular position of a rotor of a brushless direct current (BLDC) motor at standstill comprises providing a plurality of current pulses to a plurality of windings of the BLDC motor while the rotor is at a standstill position. The method further comprises measuring a plurality of current magnitudes for each of the plurality of windings after a fixed amount of time. A first position corresponding to a greatest current magnitude of the plurality of current magnitudes is determined. A position detection value is determined based on the greatest current magnitude and based on current magnitudes corresponding to positions that are adjacent to the first position. The position of the rotor at the standstill position is determined based on the position detection value and an interpolation function.

In one example, an apparatus is adapted to determine a position of a rotor of a BLDC motor, the BLDC motor including a stator having a plurality of windings. The apparatus comprises stator control circuitry, metering circuitry, and rotor position detection circuitry. The stator control circuitry is coupled to a stator and is configured to provide a plurality of currents to a plurality of windings of the stator while a rotor is at standstill. The metering circuitry is coupled to the stator. The metering circuitry is configured to measure a plurality of times that it takes for the plurality of currents to reach a threshold. The rotor position detection circuitry is coupled to the metering circuitry. The rotor position detection circuitry is configured to determine a position detection value based on the plurality of times. The rotor position detection circuitry is further configured to determine a position of the rotor at standstill based on the position detection value and an interpolation function.

BRIEF DESCRIPTION OF THE DRAWINGS

The same reference numbers are used in the drawings to designate the same or similar (functionally and/or structurally) features.

DETAILED DESCRIPTION

Figure 1:
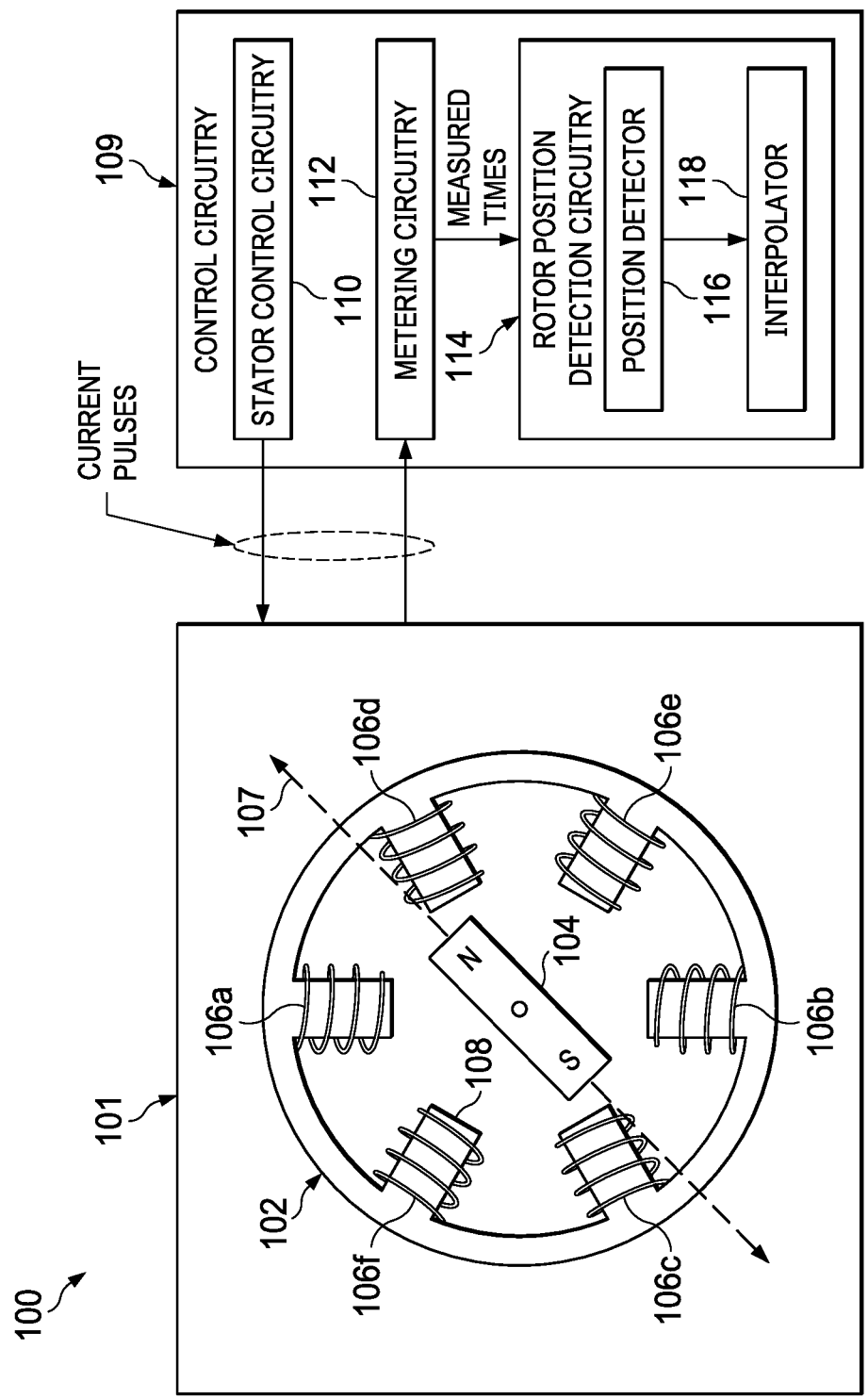
FIG. 1 is a block diagram of some embodiments of a BLDC motor system comprising rotor position detection circuitry having an interpolator configured to improve a determination of a position of a rotor at standstill.

The figures may not be drawn to scale.

When starting a brushless DC (BLDC) motor from standstill, knowing the angular position of the rotor prior to start-up may improve performance and/or reliability of the motor start-up process. Some BLDC motors have sensors to determine the angular position of the rotor at standstill. Some other BLDC motors (e.g., sensor-less BLDC motors) do not have these sensors.

Some methods for determining the angular position of a rotor of a BLDC motor at standstill include passing current pulses through windings of the BLDC motor to determine an inductance of the windings. The inductance of the windings may be based on the angular position of the rotor, which includes a permanent magnet, because the magnetic field of the rotor affects the inductance of the windings. For example, when the magnetic field of the rotor is aligned with a magnetic field generated by passing current through a winding wrapped around a core, the inductance of that winding is reduced. Thus, an angular position of the rotor at standstill may be estimated based on the determined inductance of each of the windings (e.g., a north pole of the rotor may be most closely aligned with the winding with the smallest inductance).

In some instances, the inductance of each winding may be determined by the amount of time taken for the magnitude of the current passed through each winding to reach a predetermined threshold. In some such instances, the shorter the amount of time taken for the current passed through a winding to reach the predetermined threshold, the lower the inductance of that winding. Thus, the winding associated with the shortest amount of time may be determined to have the lowest inductance, and hence the position of the rotor may be determined to be most closely aligned with the position of the winding associated with the shortest amount of time.

However, estimating the angular position of the rotor based on the winding with the smallest inductance may have a limited accuracy. For example, if the BLDC motor includes six windings that are evenly spaced apart (e.g., by an angle of 60 degrees), the estimation may only have an accuracy within a 60 degree range. Thus, the accuracy of the estimation may be low (e.g., the estimation may only give a general idea of the angular position of the rotor). As a result, a performance and/or a reliability of the start-up process of the BLDC motor may be reduced.

Various embodiments of the present description are related to a method for determining an angular position of a rotor of a sensor-less BLDC motor at standstill (e.g., without motion) with improved accuracy (e.g., with an accuracy of within approximately 60 degrees, within approximately 30 degrees, etc.). In some embodiments, the method comprises providing current pulses to a plurality of windings of a BLDC motor with the rotor at standstill. The current pulses respectively change between a first value and a second value. A time that it takes for the current pulses applied to each of the plurality of windings to reach the second value (e.g., a second current threshold) from the first value (e.g., a first current threshold) is measured. A first position of the rotor is determined from the shortest time. The first position corresponds to a winding that is closest to a north pole of the rotor. The times are subsequently acted upon by an interpolation function to determine an adjustment to the first position. The adjustment increases an accuracy of the rotor position. By determining a position of the rotor based on the position detection value and the interpolation function, the accuracy of the determination of the position of the rotor of the BLDC motor may be improved. For example, the interpolation function may output the angular position of the rotor with an accuracy of within about 10 degrees. Because an accuracy of the determination of the position of the rotor may be improved, a performance of the BLDC motor (e.g., a torque of the BLDC motor) and/or a reliability of start-up of the BLDC motor may be improved.

FIG. 1 is a block diagram of some embodiments of a BLDC motor system 100 comprising rotor position detection circuitry 114 having an interpolator 118 configured to improve a determination of a position of a rotor 104 at standstill.

The BLDC motor system 100 comprises a BLDC motor 101 coupled to control circuitry 109. The BLDC motor 101 comprises a stator 102 and a rotor 104. The rotor 104 comprises a plurality of cores 108 protruding outward from a loop of the stator 102 that surrounds the rotor 104. A plurality of windings 106a-106f respectively wrap around the plurality of cores 108. The rotor 104 comprises a permanent magnet having a north pole N and a south pole S. The permanent magnet is configured to generate a magnetic field extending along a rotor magnetic field vector 107.

The control circuitry 109 comprises stator control circuitry 110, metering circuitry 112, and rotor position detection circuitry 114. When the rotor 104 is held at a stationary position (e.g., without moving), the stator control circuitry 110 is configured to apply a pulsed current to respective ones of the plurality of windings 106a-106f. The pulsed current changes over time. For example, the pulsed current changes over time between a first value and a second value. The metering circuitry 112 is configured to measure a current value on each of the plurality of windings 106a-106f and to measure times that it takes for the pulsed current to reach the second value from the first value on each of the plurality of windings 106a-106f. The first value and the second value are a first current magnitude and a second current magnitude, respectively.

The times that it takes a pulsed current to reach the second value from the first value are provided to the rotor position detection circuitry 114. The rotor position detection circuitry 114 comprises a position detector 116 configured to determine a first position of the rotor 104 (e.g., a position of the winding which the north pole N of the rotor 104 is closest to) from the times. For example, the magnetic field generated by the permanent magnet of the rotor 104 will pass through the plurality of windings 106a-106f to different degrees depending on an orientation of the rotor 104. As a current is applied to a winding of the plurality of windings 106a-106f, the current will change a magnetic flux through the winding. According to Lenz' law the change in current will induce an EMF that resists the change in current. Because the magnetic field generated by the rotor 104 will cause a different magnetic field to be applied to different ones of the plurality of windings 106a-106f, the currents applied to different ones of the plurality of windings 106a-106f will take different amounts of time to reach the second value. The amount of time that it will take for the current to reach the second value is dependent upon an inductance of a winding (e.g., since the change in current in an RL circuit is dependent on the time constant, $\tau$, where $\tau=L/R$). For example, winding 106d is close to the north pole N of the rotor 104 and thus will have a lower inductance (e.g., a lower resistance to current changes) than winding 106e, which is further from the north pole N. The lower inductance will cause a current pulse applied to the winding 106d to take a shorter time to reach the second value than a current pulse applied to winding 106e. From the times measured by the metering circuitry 112, the first position of the rotor 104 can be determined.

The rotor position detection circuitry 114 also comprises an interpolator 118. The interpolator 118 is configured to receive the times. Because the times are a function of the position of the rotor 104, the interpolator 118 is able to make an estimate of the position of the rotor 104 from the times to get a better determination of the position of the rotor 104. In some embodiments the interpolator 118 may apply an interpolation function to the times to generate an adjustment value that can be added to the first position to achieve a rotor position having a greater accuracy than the first position. For example, in some embodiments the interpolator 118 may improve a resolution of the rotor position from a first position of approximately 60 degrees to a rotor position of approximately 10 degrees. In other embodiments, the rotor position may be less than approximately 15 degrees, less than approximately 10 degrees, less than approximately 5 degrees, or other similar values.

By utilizing the interpolator 118 to apply an interpolation function to find the rotor position, the rotor position detection circuitry 114 is able to provide for improved resolution of the rotor position. By improving an accuracy of the rotor position estimation, a performance and/or reliability of a start-up of the BLDC motor 101 may be improved.

FIGS. 2A-2D include diagrams 200, 212, 214, and 220, respectively, of some embodiments of a method of using an interpolation function to improve a determination of a position of a rotor 104 at standstill.

Figure 2A:
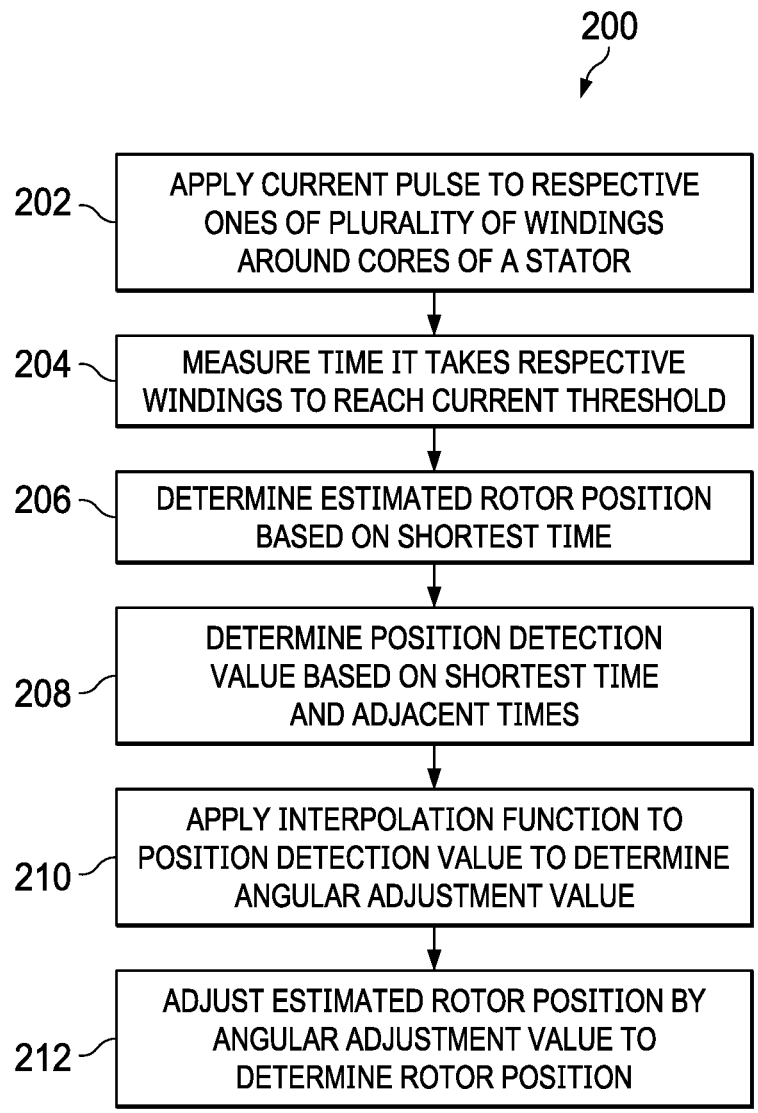
FIGS. 2A-2D are diagrams of some embodiments of a method of using an interpolation function to improve a determination of a position of a rotor at standstill.
Figure 2B:
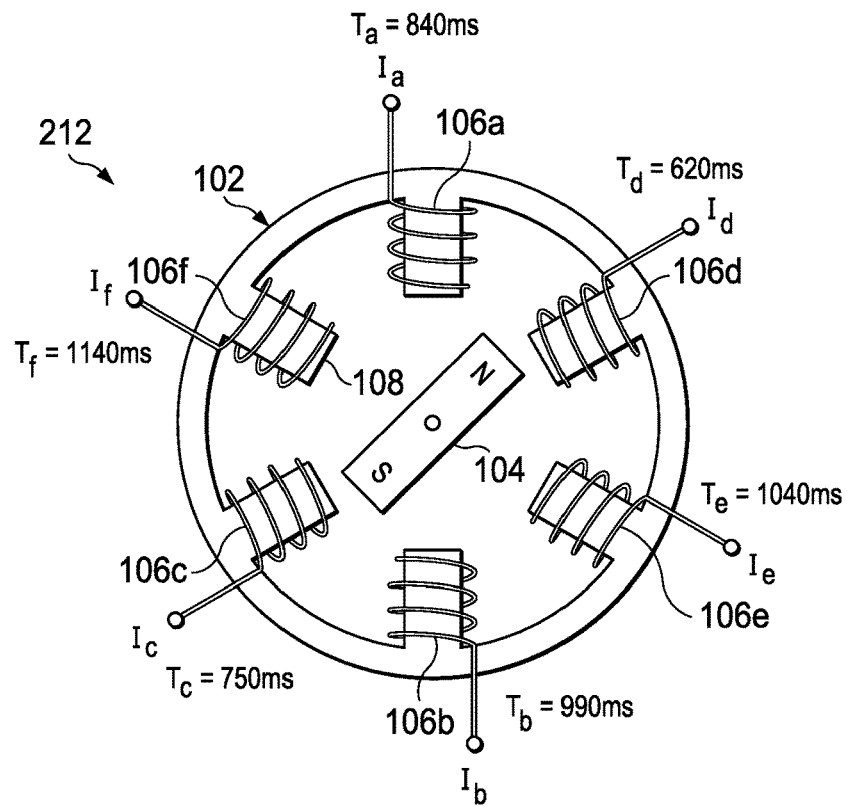
Figure 2C:
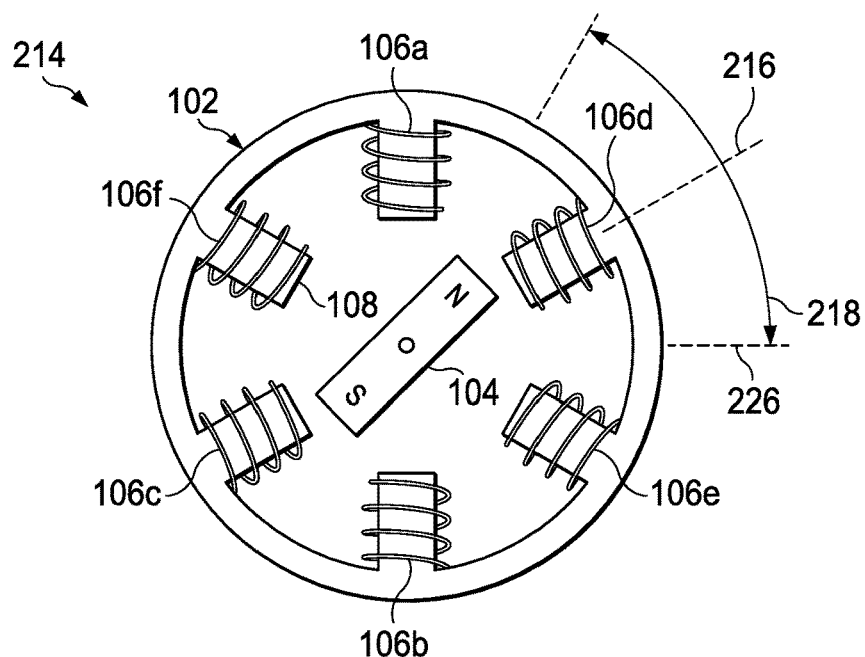
Figure 2D:
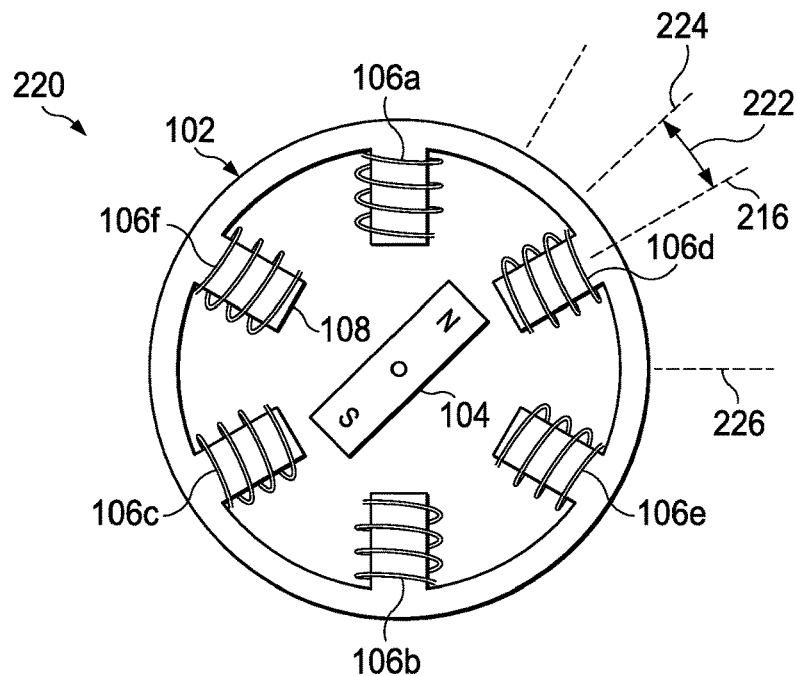

Referring to the methodology of FIG. 2A, at 202, a current pulse is applied to respective ones of plurality of windings around cores of a stator while a rotor is held in a stationary position. The current pulse changes from a first (current magnitude) value to a second (current magnitude) value on each of the plurality of windings. In some embodiments, current pulses may be provided to the plurality of windings at a same time, while in other embodiments the current pulses may be provided to the plurality of windings at different times. FIG. 2B illustrates a diagram 212 of a stator and a rotor in a stationary position. Current pulses $I_a$-$I_f$ are applied to windings wrapping around cores of the stator. Each current pulse of the current pulses $I_a$-$I_f$ respectively change between a first value and a second value. For example, in some embodiments, one of the current pulses $I_a$-$I_f$ may be applied to one of the plurality of windings for a first time (e.g., in a range of between approximately 10 ms and approximately 1000 ms). In some embodiments, the current pulses $I_a$-$I_f$ may be generated by applying a same voltage (e.g., in a range of between approximately 100 mV and approximately 500 mV) to each of the plurality of windings 106a-106f for the first time (e.g., in a range of between approximately 1 ms and approximately 1000 ms). The applied voltage will result in a pulsed current that continuously increases over the first time from the first value (e.g., approximately 0 mA) to the second value (e.g., approximately 0.25 A, approximately 0.5 A, approximately 1 A, or other similar values). The time that it takes for each of the plurality of current pulses to reach the second value is dependent upon a time constant ($\tau$, where $\tau=L/R$) of an associated one of the plurality of winding, so that the time that it takes for each of the plurality of current pulses to go from the first value to the second value may be different. In some other embodiments, the current pulses may continuously decrease from the first value to the second value. The first value and the second value may be the same for each winding. In some embodiments, the second value may be larger than the first value, while in some other embodiments the first value may be larger than the second value.

At 204, a time is measured that it takes for the current applied to each winding to reach a current threshold. In some embodiments, the current threshold may be the second value. As shown in diagram 212 of FIG. 2B, a current pulse applied to winding 106a will take approximately 840 ms (milliseconds) to reach a second value, a current pulse applied to winding 106d will take approximately 620 ms to reach the second value, a current pulse applied to a winding 106e will take approximately 1040 ms to reach the second value, etc.

At 206, an estimated rotor position is determined based upon a shortest measured time and a position (e.g., an angle) associated with the shortest amount of time. As shown in diagram 214 of FIG. 2C, because the current applied to winding 106d took a shortest measured time to reach the second value, an estimated rotor position 216 may correspond to winding 106d having a position of 30 degrees measured relative to a reference angle 226. This estimated rotor position 216 indicates that a north pole N of the rotor 104 is closest to winding 106d. While the estimated rotor position 216 is centered upon 30 degrees (e.g., as measured from a reference angle 226), the north pole N of the rotor 104 may be anywhere within an estimated rotor position range 218 that extends from between the first winding 106a and the fourth winding 106d to between the fourth winding 106d and the fifth winding 106e, since the estimated rotor position range 218 contains positions that are closest to the fourth winding 106d.

At 208, a position detection value is determined based on the shortest measured time and on the two adjacent times (e.g., the two times associated with the angles that are adjacent to the angle associated with the shortest time). For example, in some embodiments, a position detection value is $$\frac{\left(\frac{1}{T_m} - \frac{1}{T_{nm}}\right)}{\left(\frac{1}{T_m} - \frac{1}{T_{nnm}}\right)} \quad (1)$$

where $T_m$ is the shortest time, $T_{nm}$ is the shorter time of the two adjacent times (e.g., the shorter of the two times associated with the angles that are adjacent to the angle associated with $T_m$), and $T_{nnm}$ is the longer of the two adjacent times (e.g., the longer time of the two times associated with the angles that are adjacent to the angle associated with $T_m$). In the example shown in FIGS. 2B-2C, $T_m$ is 620 because it is the shortest overall time, $T_{nm}$ is 840 because 840 is the shorter of the two adjacent times (e.g., 840 and 1040), and $T_{nnm}$ is 1040 because 1040 is the longer of the two adjacent times. In the example shown in FIGS. 2B-2C, the position detection value is calculated to be 0.6485 using equation (1). The position detection value can be used to estimate a position of the rotor 104 based upon an interpolation function that uses the position detection value.

At 210, an interpolation function is applied to the position detection value to determine an angular adjustment value 222. In some embodiments, an angular adjustment value 222 may be determined by interpolating (e.g., using a linear best fit) a function that describes a relationship between angular position and the times that it takes for multiple ones of the plurality of windings to reach the second value from the first value. In some embodiments, the interpolation may result in a linear function that subtracts a product of a first constant and the position detection value from a second constant. For example, as shown in diagram 220 of FIG. 2D, a linear fit may provide for an interpolation function including a position detection value of 0.6485 multiplied by a first constant of 31.25, and the product of that multiplication is subtracted from a second constant 30.64375 to determine an angular adjustment value 222 of 10.377 degrees. Some more detailed examples of interpolation functions are illustrated below by equation (15) and equation (16).

At 212, a rotor position is determined by adjusting the estimated rotor position by the adjustment value determined from the position detection value. In some embodiments, the rotor position may be determined by adding or subtracting the angular adjustment value from an angle corresponding to the shortest time. For example, the angular adjustment value 222 of 10.377 degrees (e.g., determined at 210) is added to the estimated rotor position 216 of 30 degrees (e.g., determined at 206) to arrive at an adjusted angle 224 (e.g., the rotor position) of 40.377 degrees. For more details see below (e.g., see equation (15)).

Figure 7:
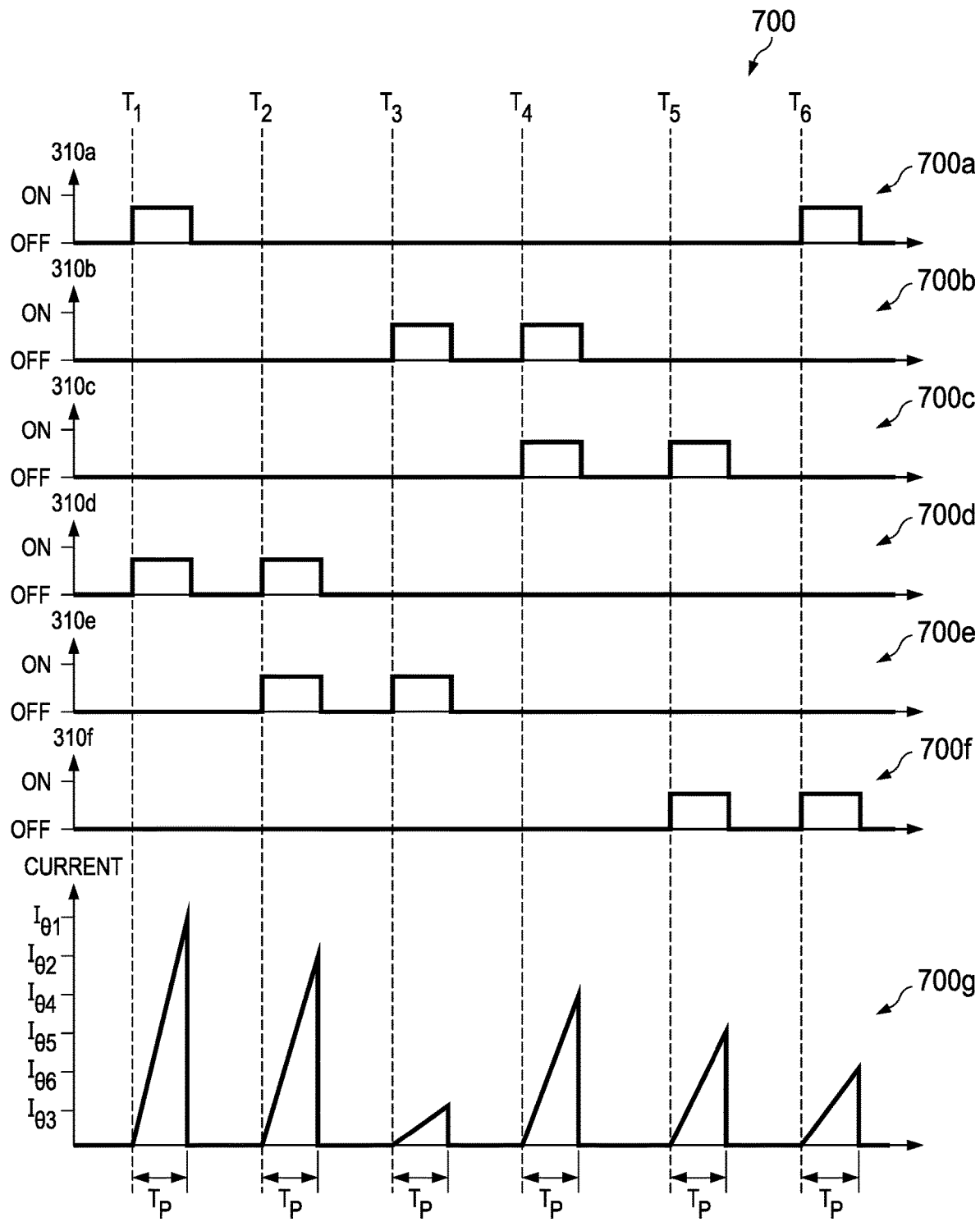
FIG. 7 is a timing diagram of some alternative embodiments of a method for determining an angular position of a rotor of a BLDC motor at standstill.
Figure 9:
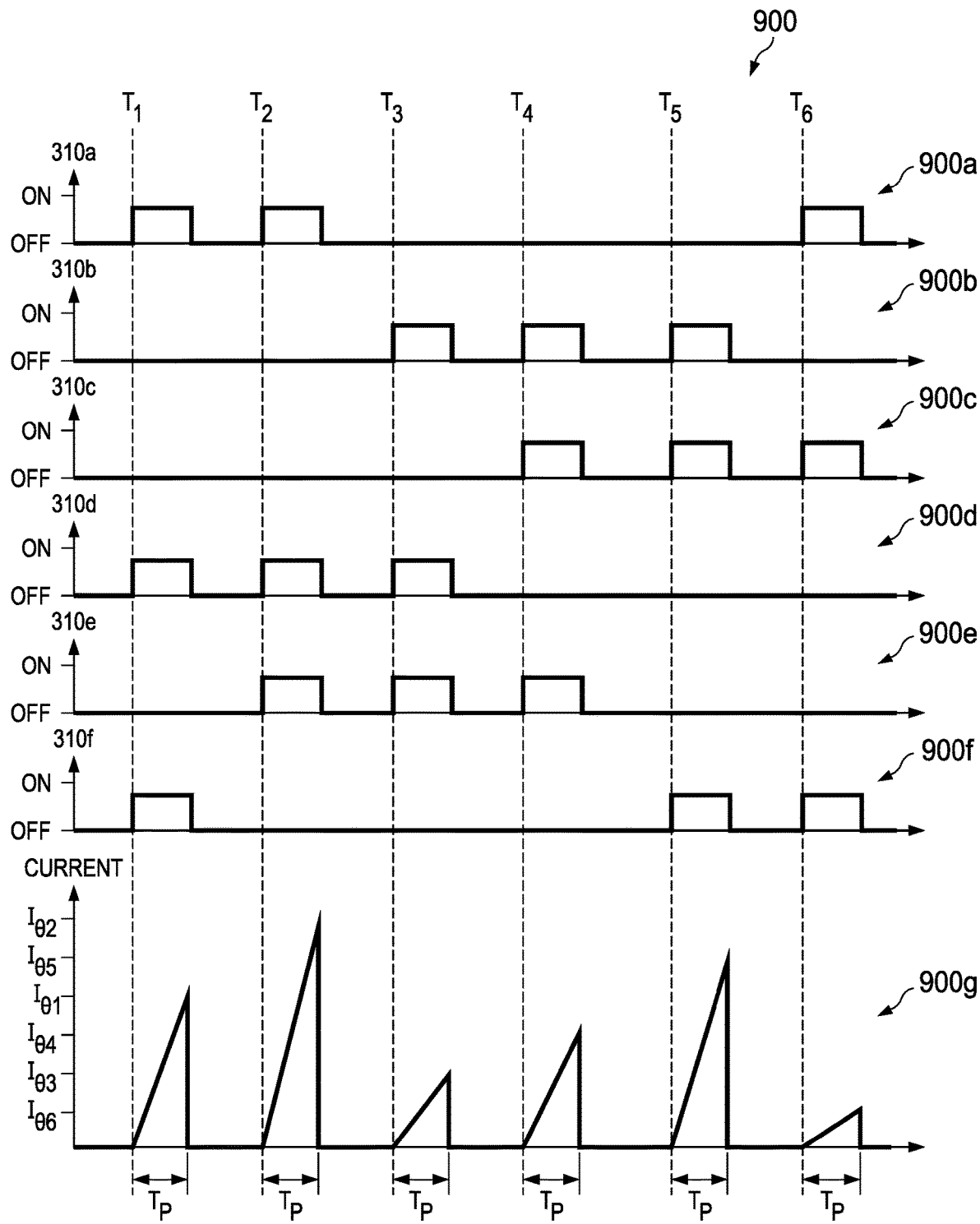
FIG. 9 is a timing diagram of some other alternative embodiments of a method for determining an angular position of a rotor of a BLDC motor at standstill.

Although 202-212 describe determining the rotor position at standstill based on measured times that it takes for currents applied to windings to reach a threshold, it will be appreciated that in some alternative embodiments, the rotor position at standstill may alternatively be determined based on magnitudes of currents applied to the windings after a fixed period of time (e.g., as shown in FIG. 7 and FIG. 9).

Figure 3A:
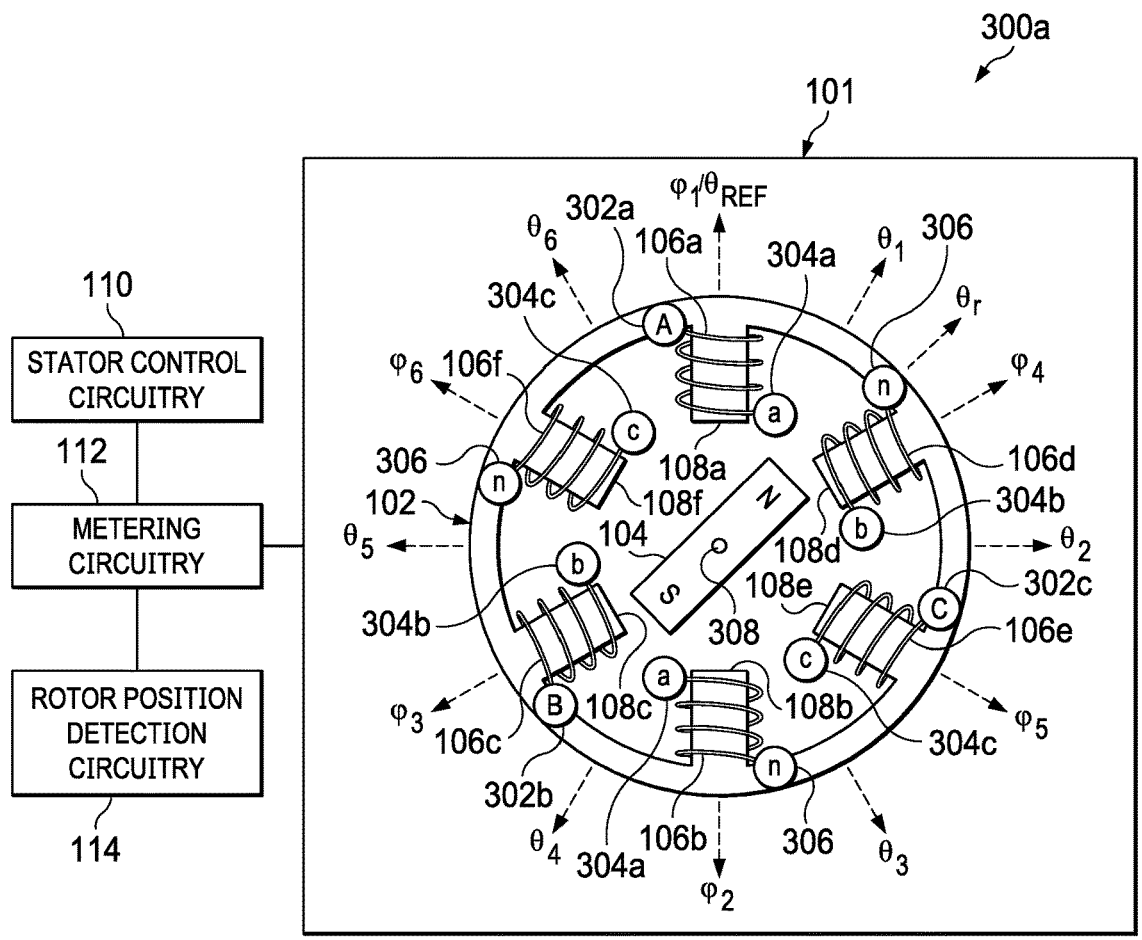
FIG. 3A is a diagram of some embodiments of a sensor-less BLDC motor coupled to stator control circuitry, metering circuitry, and rotor position detection circuitry.

FIG. 3A is a diagram 300a of some additional embodiments of a sensor-less BLDC motor 101 coupled to stator control circuitry 110, metering circuitry 112, and rotor position detection circuitry 114.

The BLDC motor 101 comprises a stator 102 and a rotor 104. The stator 102 comprises a plurality of phases (e.g., phase A, phase B, and phase C). Each phase has a plurality of windings 106a-106f. For example, phase A has a first winding 106a and a second winding 106b, phase B has a third winding 106c and a fourth winding 106d, and phase C has a fifth winding 106e and a sixth winding 106f.

The stator 102 comprises a plurality of cores 108a-108f that are surrounded by the windings 106a-106f, respectively. For example, a first core 108a is surrounded by the first winding 106a, a second core 108b is surrounded by the second winding 106b, a third core 108c is surrounded by the third winding 106c, a fourth core 108d is surrounded by the fourth winding 106d, a fifth core 108e is surrounded by the fifth winding 106e, and a sixth core 108f is surrounded by the sixth winding 106f. Each of the windings 106a-106f and their respective cores 108a-108f are disposed at different angular positions (e.g., a first angular position (pi through a sixth angular position $\varphi_6$, respectively) that are evenly spaced around the stator 102 (e.g., at angles of 60 degrees apart).

A first primary node 302a (e.g., of phase A) is coupled to a first intermediate node 304a (e.g., of phase A) through the first winding 106a. The first intermediate node 304a is coupled to a neutral node 306 through the second winding 106b. A second primary node 302b (e.g., of phase B) is coupled to a second intermediate node 304b (e.g., of phase B) through the third winding 106c. The second intermediate node 304b is coupled to the neutral node 306 through the fourth winding 106d. A third primary node 302c (e.g., of phase C) is coupled to a third intermediate node 304c (e.g., of phase C) through the fifth winding 106e. The third intermediate node 304c is coupled to the neutral node 306 through the sixth winding 106f. It should be noted that some connections between some coupled nodes (e.g., a-a, b-b, c-c, n-n-n, etc.) are not illustrated for clarity of illustration.

The rotor 104 is arranged within the stator 102 so the rotor 104 is surrounded by the windings 106a-106f and cores 108a-108f of the stator 102. The rotor 104 comprises a permanent magnet that has a first polarity (e.g., a north pole) at one end and a second polarity (e.g., a south pole) opposite the first polarity at the opposing end. The rotor 104 is configured to rotate about a central axis 308 in a clockwise or counterclockwise direction.

The stator control circuitry 110 is coupled to the windings 106a-106f of the stator 102. The metering circuitry 112 is also coupled to the windings 106a-106f of the stator 102. In some embodiments, the metering circuitry 112 is coupled between the stator control circuitry 110 and the stator 102. The rotor position detection (RPD) circuitry 114 is coupled to the stator 102 and/or the metering circuitry 112.

In some embodiments, the stator control circuitry 110 is configured to provide a first current to a first pair of windings (e.g., 106a and 106b) of the stator 102 at a first time, a second current to a second pair of windings (e.g., 106c and 106d) of the stator 102 at a second time, and a third current to a third pair of windings (e.g., 106e and 106f) of the stator 102 at a third time.

In some embodiments, the metering circuitry 112 is configured to measure the first current, the second current, and the third current. In some embodiments, the metering circuitry 112 is further configured to measure a first amount of time taken for the first current to reach a threshold, to measure a second amount of time taken for the second current to reach the threshold, and to measure a third amount of time taken for the third current to reach the threshold. The RPD circuitry 114 is configured to determine a position detection value based on the first amount of time, the second amount of time, and the third amount of time. The RPD circuitry 114 is further configured to determine a position of the rotor $\theta_R$ at standstill based on the determined position detection value and an interpolation function. For example, the RPD circuitry 114 is configured to perform the interpolation function—which outputs the position of the rotor $\theta_R$—using the position detection value as an input of the interpolation function. In some embodiments, the position detection value may be multiplied by a first constant, and the product of that multiplication may be subtracted from a second constant to determine an adjustment value. The adjustment value may subsequently be added or subtracted from a position (e.g., angle) corresponding to the shortest amount of time in order to determine the position of the rotor $\theta_R$.

The interpolation function may allow for determination of the position of the rotor $\theta_R$ with high accuracy. Thus, by determining a position of the rotor $\theta_R$ based on the position detection value and the interpolation function, the accuracy of the determination of the position of the rotor $\theta_R$ of the BLDC motor 101 may be improved. Because an accuracy of the determination of the position of the rotor $\theta_R$ may be improved, a performance and/or reliability of a start-up of the BLDC motor 101 may be improved.

Figure 3B:
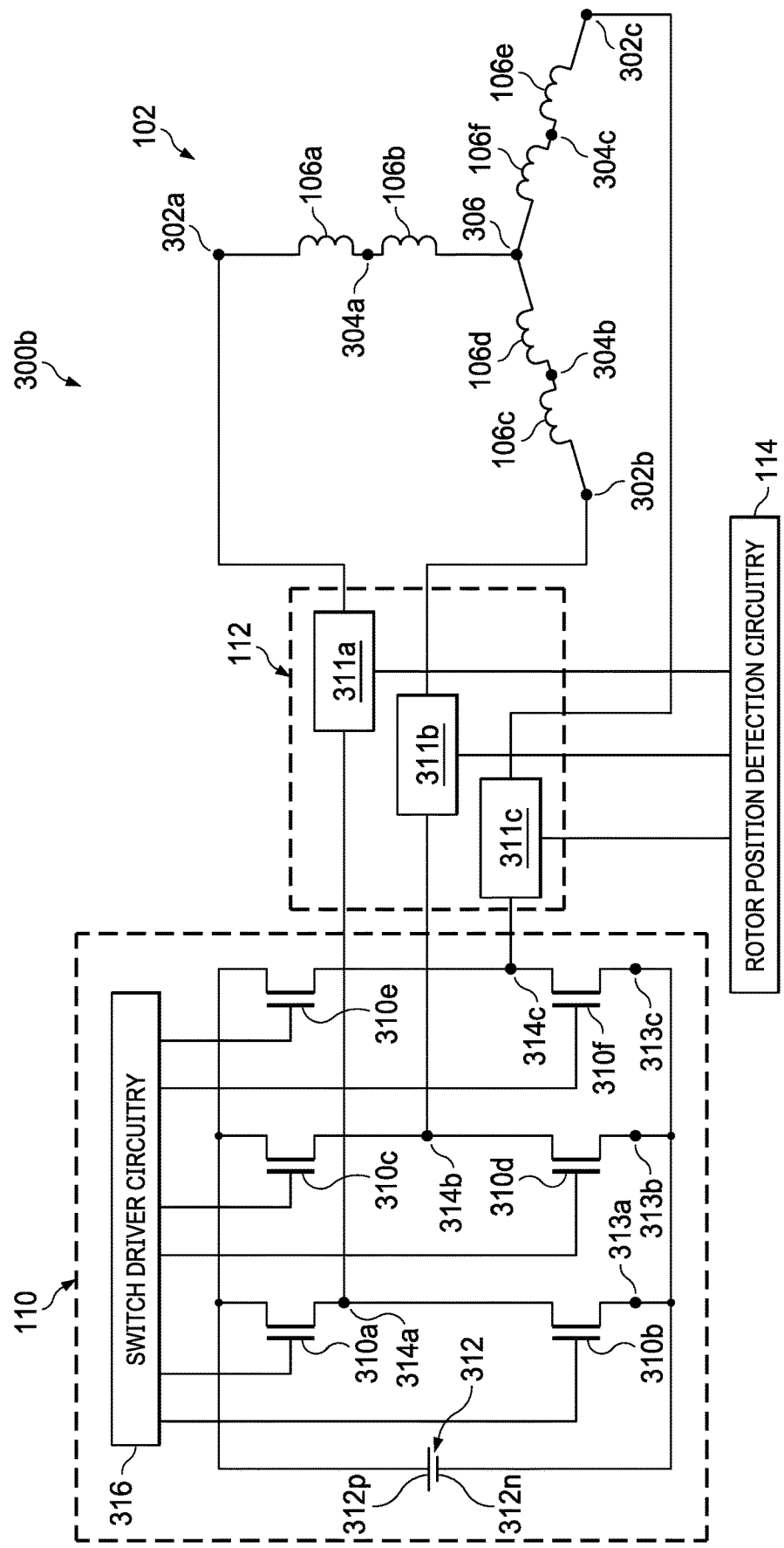
FIG. 3B is a circuit diagram of the stator, the stator control circuitry, the metering circuitry, and the rotor position detection circuitry of FIG. 3A.

FIG. 3B is a circuit diagram 300b of the stator 102, the stator control circuitry 110, the metering circuitry 112, and the rotor position detection circuitry 114 of FIG. 3A.

In some embodiments, the stator control circuitry 110 comprises a plurality of transistors 310a-310f, including a high side transistor (e.g., 310a, 310c, 310e) for each phase and a low side transistor (e.g., 310b, 310d, 310f) for each phase. While each of the transistors 310a-310f are illustrated as metal-oxide-silicon field effect transistors (MOSFETs), these transistors can be either n-type (nMOSFETs), p-type (pMOSFETs) or a mixture of these. In addition, transistors 310a-310f may be implemented other types of transistors (such as bipolar transistors).

For example, the stator control circuitry 110 comprises a first transistor 310a coupled between a positive terminal 312p of a voltage source 312 and a first common switch node 314a. A second transistor 310b is coupled between a negative terminal 312n of the voltage source 312 and the first common switch node 314a. The first common switch node 314a is coupled to the first primary node 302a (e.g., of phase A).

A third transistor 310c is coupled between the positive terminal 312p of the voltage source 312 and a second common switch node 314b. A fourth transistor 310d is coupled between the negative terminal 312n of the voltage source 312 and the second common switch node 314b. The second common switch node 314b is coupled to the second primary node 302b (e.g., of phase B).

A fifth transistor 310e is coupled between the positive terminal 312p of the voltage source 312 and a third common switch node 314c. A sixth transistor 310f is coupled between the negative terminal 312n of the voltage source 312 and the third common switch node 314c. The third common switch node 314c is coupled to the third primary node 302c (e.g., of phase C).

In some embodiments, switch driver circuitry 316 is coupled to gates of each of the transistors 310a-310f. The switch driver circuitry 316 is configured to control the states (e.g. conducting, non-conducting, saturated, etc.) of each of the transistors 310a-310f. For example, the switch driver circuitry 316 is configured to control when each transistor is turned on and off (e.g., by applying a voltage to the gates of the transistors 310a-310f).

In some embodiments, the metering circuitry 112 is coupled between the common switch nodes 314a-314c and the primary nodes 302a-302c. For example, in some embodiments, the metering circuitry 112 comprises a first metering device 311a coupled (e.g., in series) between the first common switch node 314a and the first primary node 302a, a second metering device 311b coupled (e.g., in series) between the second common switch node 314b and the second primary node 302b, and a third metering device 311c coupled (e.g., in series) between the third common switch node 314c and the third primary node 302c. In some embodiments, the metering devices 311a-311c may, for example, comprise ammeters or the like and are configured to measure current passing through them.

In some alternative embodiments, the metering circuitry 112 may alternatively be coupled between the low side transistors (e.g., the second transistor 310b, the fourth transistor 310d, and the sixth transistor 310f) and the negative terminal 312n of the voltage source 312. For example, the first metering device 311a may alternatively be coupled between the second transistor 310b and the negative terminal 312n (e.g., at point 313a), the second metering device 311b may alternatively be coupled between the fourth transistor 310d and the negative terminal 312n (e.g., at point 313b), and the third metering device 311c may alternatively be coupled between the sixth transistor 310f and the negative terminal 312n (e.g., at point 313c).

In some embodiments, the metering circuitry 112 is configured to measure an amount of time between a current reaching a first current threshold and the current reaching a second current threshold different from the first current threshold, where the current is measured by the metering circuitry 112. For example, the metering circuitry 112 may comprise a timer configured to start timing when a magnitude of a current reaches the first current threshold and stop timing when the magnitude of the current reaches the second current threshold.

In some embodiments, the RPD circuitry 114 is coupled to each of the metering devices 311a-311c. In some embodiments, the RPD circuitry 114 is configured to rank times measured by the metering circuitry 112 from shortest to longest or vice versa. The RPD circuitry 114 is also configured to perform linear or non-linear calculations using the times measured by the metering circuitry 112 to determine a position of the rotor 104 at standstill. In some embodiments, the position of the rotor is an angular position of a first pole of the rotor. In some embodiments, the RPD circuitry 114 may, for example, comprise hardware, software, a combination of hardware and software, or some other suitable circuitry.

In some embodiments, determining the position of the rotor at standstill comprises providing a positive voltage across each winding and subsequently providing a negative voltage across each wining, or vice versa, so each winding is energized at least twice.

Figure 4:
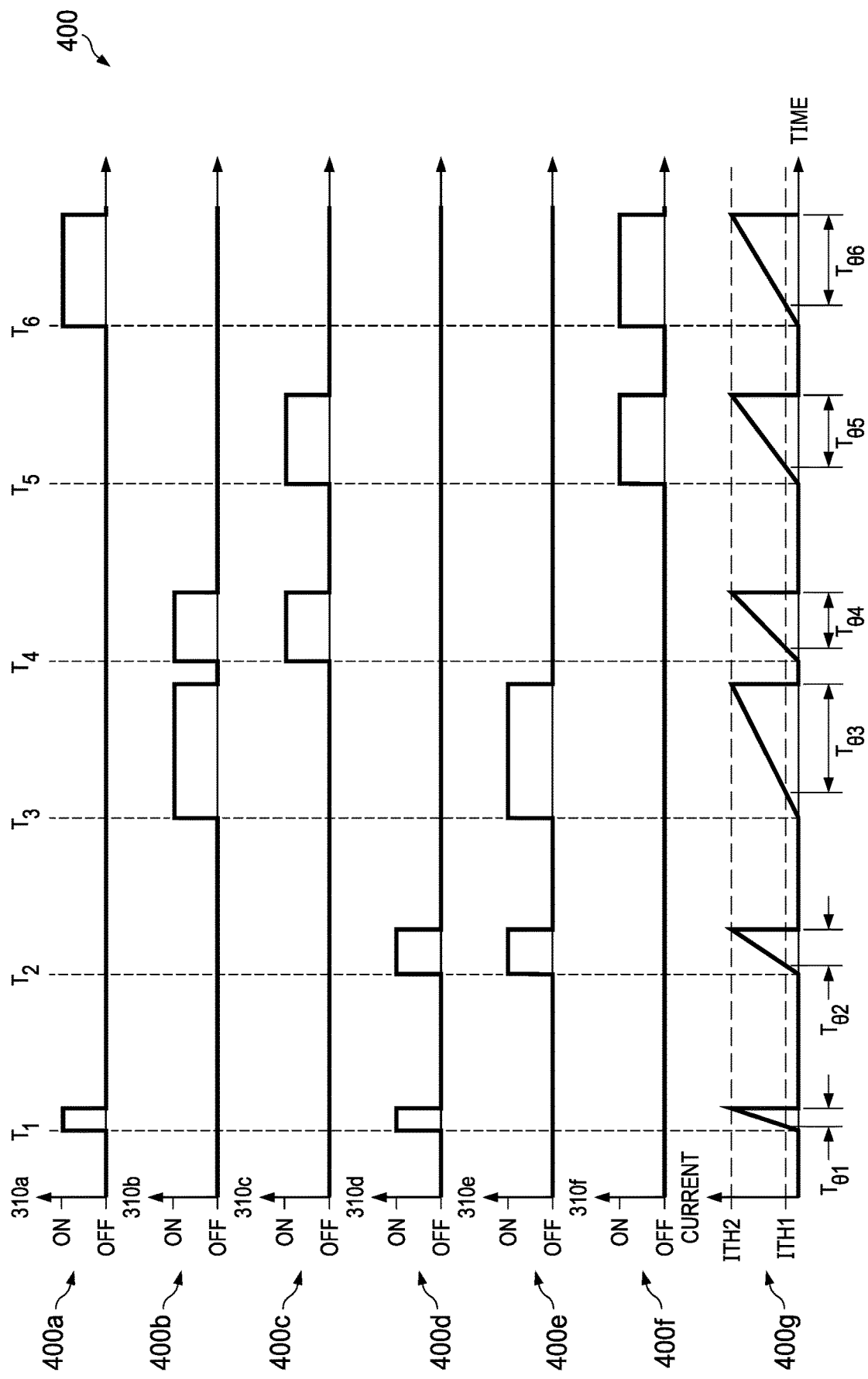
FIG. 4 is a timing diagram of some embodiments of a method for determining an angular position of a rotor of a BLDC motor at standstill.

FIG. 4 is a timing diagram 400 of some embodiments of a method for determining an angular position $\theta_R$ of a rotor (e.g. 104 of FIGS. 1, 2B-2D, and 3A) of a BLDC motor (e.g., 101 of FIGS. 1 and 3A) at standstill. For example, the timing diagram 400 comprises graphs 400a-400f of the states of the first transistor 310a of FIG. 3B through the sixth transistor 310f of FIG. 3B, respectively, over time. The timing diagram 400 also comprises a graph 400g of the current passing through the windings of the BLDC motor over time (e.g., the current measured by the metering circuitry 112 of FIGS. 3A and 3B over time).

In some embodiments, to determine the angular position of the rotor $\theta_R$, a current is passed through each winding 106a-106f of the BLDC motor, and an amount of time that it takes for each current to reach a second current threshold $I_{TH2}$ from a first current threshold $I_{TH1}$ is measured (e.g., by the metering circuitry 112 of FIGS. 1, 3A, and 3B).

For example, at a first time T1, the first transistor 310a is turned on and the fourth transistor 310d is turned on (e.g., by the switch driver circuitry 316 of FIG. 3B) so the positive voltage terminal 312p is applied to the first primary node 302a and the negative voltage terminal 312n is applied to the second primary node 302b. As a result, a first current is passed from the positive terminal 312p through the first primary node 302a, through the first winding 106a, through the first intermediate node 304a, through the second winding 106b, through the neutral node 306, through the fourth winding 106d, through the second intermediate node 304b, through the third winding 106c, and through the second primary node 302b to negative terminal 312n.

The first current passing through the first winding 106a, the second winding 106b, the fourth winding 106d, and the third winding 106c generates a first magnetic field around the first winding 106a and in the first core 108a, around the second winding 106b and in the second core 108b, around the fourth winding 106d and in the fourth core 108d, and around the third winding 106c and in the third core 108c.

The first magnetic field has a first resultant direction $\theta_1$ (e.g., a first net direction of magnetization). The first resultant direction $\theta_1$ is disposed at a first angle relative to a reference angle $\theta_{REF}$. In some embodiments, the first resultant direction $\theta_1$ is between the first winding 106a and the fourth winding 106d.

The amount of time that it takes for the first current to reach the second current threshold $I_{TH2}$ from the first current threshold $I_{TH1}$ is measured (e.g., by the metering circuitry 112 of FIGS. 1, 3A, and 3B) and recorded as $T_{\theta 1}$. $\theta_1$ may be referred to as an amount of time associated with the first resultant direction $\theta_1$. In some embodiments, the first transistor 310a and the fourth transistor 310d are turned off in response to the first current reaching the second current threshold $I_{TH2}$.

At a second time T2, the fourth transistor 310d is turned on and the fifth transistor 310e is turned on (e.g., by the switch driver circuitry 316 of FIG. 3B) so the positive voltage terminal 312p is applied to the third primary node 302c and the negative voltage terminal 312n is applied to the second primary node 302b. As a result, a second current is passed from the positive terminal 312p through the third primary node 302c, through the fifth winding 106e, through the third intermediate node 304c, through the sixth winding 106f, through the neutral node 306, through the fourth winding 106d, through the second intermediate node 304b, through the third winding 106c, and through the second primary node 302b to negative terminal 312n.

The second current passing through the fifth winding 106e, the sixth winding 106f, the fourth winding 106d, and the third winding 106c generates a second magnetic field around the fifth winding 106e and in the fifth core 108e, around the sixth winding 106f and in the sixth core 108f, around the fourth winding 106d and in the fourth core 108d, and around the third winding 106c and in the third core 108c.

The second magnetic field has a second resultant direction $\theta_2$ (e.g., a second net direction of magnetization). The second resultant direction $\theta_2$ is disposed at a second angle relative to the reference angle $\theta_{REF}$. In some embodiments, the second resultant direction $\theta_2$ is between the fourth winding 106d and the fifth winding 106e.

The amount of time that it takes for the second current to reach the second current threshold $I_{TH2}$ from the first current threshold $I_{TH1}$ is measured and recorded as $T_{\theta2}$. $T_{\theta2}$ may be referred to as an amount of time associated with the second resultant direction $\theta_2$. In some embodiments, the fourth transistor 310d and the fifth transistor 310e are turned off in response to the second current reaching the second current threshold $I_{TH2}$.

At a third time T3, the second transistor 310b is turned on and the fifth transistor 310e is turned on (e.g., by the switch driver circuitry 316 of FIG. 3B) so the positive voltage terminal 312p is applied to the third primary node 302c and the negative voltage terminal 312n is applied to the first primary node 302a. As a result, a third current is passed from the positive terminal 312p through the third primary node 302c, through the fifth winding 106e, through the third intermediate node 304c, through the sixth winding 106f, through the neutral node 306, through the second winding 106b, through the first intermediate node 304a, through the first winding 106a, and through the first primary node 302a to negative terminal 312n.

The third current passing through the fifth winding 106e, the sixth winding 106f, the second winding 106b, and the first winding 106a generates a third magnetic field around the fifth winding 106e and in the fifth core 108e, around the sixth winding 106f and in the sixth core 108f, around the second winding 106b and in the second core 108b, and around the first winding 106a and in the first core 108a.

The third magnetic field has a third resultant direction $\theta_3$ (e.g., a third net direction of magnetization). The third resultant direction $\theta_3$ is disposed at a third angle relative to the reference angle $\theta_{REF}$. In some embodiments, the third resultant direction $\theta_3$ is between the fifth winding 106e and the second winding 106b.

The amount of time that it takes for the third current to reach the second current threshold $I_{TH2}$ from the first current threshold $I_{TH1}$ is measured and recorded as $T_{\theta3}$. $T_{\theta3}$ may be referred to as an amount of time associated with the third resultant direction $\theta_3$. In some embodiments, the second transistor 310b and the fifth transistor 310e are turned off in response to the third current reaching the second current threshold $I_{TH2}$.

At a fourth time T4, the second transistor 310b is turned on and the third transistor 310c is turned on (e.g., by the switch driver circuitry 316 of FIG. 3B) so the positive voltage terminal 312p is applied to the second primary node 302b and the negative voltage terminal 312n is applied to the first primary node 302a. As a result, a fourth current is passed from the positive terminal 312p through the second primary node 302b, through the third winding 106c, through the second intermediate node 304b, through the fourth winding 106d, through the neutral node 306, through the second winding 106b, through the first intermediate node 304a, through the first winding 106a, and through the first primary node 302a to negative terminal 312n.

The fourth current passing through the third winding 106c, the fourth winding 106d, the second winding 106b, and the first winding 106a generates a fourth magnetic field around the third winding 106c and in the third core 108c, around the fourth winding 106d and in the fourth core 108d, around the second winding 106b and in the second core 108b, and around the first winding 106a and in the first core 108a.

The fourth magnetic field has a fourth resultant direction $\theta_4$ (e.g., a fourth net direction of magnetization). The fourth resultant direction $\theta_4$ is disposed at a fourth angle relative to the reference angle $\theta_{REF}$. In some embodiments, the fourth resultant direction $\theta_4$ is between the second winding 106b and the third winding 106c.

The amount of time that it takes for the fourth current to reach the second current threshold $I_{TH2}$ from the first current threshold $I_{TH1}$ is measured and recorded as $T_{\theta4}$. $T_{\theta4}$ may be referred to as an amount of time associated with the fourth resultant direction $\theta_4$. In some embodiments, the second transistor 310b and the third transistor 310c are turned off in response to the fourth current reaching the second current threshold $I_{TH2}$.

At a fifth time T5, the third transistor 310c is turned on and the sixth transistor 310f is turned on (e.g., by the switch driver circuitry 316 of FIG. 3B) so the positive voltage terminal 312p is applied to the second primary node 302b and the negative voltage terminal 312n is applied to the third primary node 302c. As a result, a fifth current is passed from the positive terminal 312p through the second primary node 302b, through the third winding 106c, through the second intermediate node 304b, through the fourth winding 106d, through the neutral node 306, through the sixth winding 106f, through the third intermediate node 304c, through the fifth winding 106e, and through the third primary node 302c to negative terminal 312n.

The fifth current passing through the third winding 106c, the fourth winding 106d, the sixth winding 106f, and the fifth winding 106e generates a fifth magnetic field around the third winding 106c and in the third core 108c, around the fourth winding 106d and in the fourth core 108d, around the sixth winding 106f and in the sixth core 108f, and around the fifth winding 106e and in the fifth core 108e.

The fifth magnetic field has a fifth resultant direction $\theta_5$ (e.g., a fifth net direction of magnetization). The fifth resultant direction $\theta_5$ is disposed at a fifth angle relative to the reference angle $\theta_{REF}$. In some embodiments, the fifth resultant direction $\theta_5$ is between the third winding 106c and the sixth winding 106f.

The amount of time that it takes for the fifth current to reach the second current threshold $I_{TH2}$ from the first current threshold $I_{TH1}$ is measured and recorded as $T_{\theta5}$. $T_{\theta5}$ may be referred to as an amount of time associated with the fifth resultant direction $\theta_5$. In some embodiments, the third transistor 310c and the sixth transistor 310f are turned off in response to the fifth current reaching the second current threshold $I_{TH2}$.

At a sixth time T6, the first transistor 310a is turned on and the sixth transistor 310f is turned on (e.g., by the switch driver circuitry 316 of FIG. 3B) so the positive voltage terminal 312p is applied to the first primary node 302a and the negative voltage terminal 312n is applied to the third primary node 302c. As a result, a sixth current is passed from the positive terminal 312p through the first primary node 302a, through the first winding 106a, through the first intermediate node 304a, through the second winding 106b, through the neutral node 306, through the sixth winding 106f, through the third intermediate node 304c, through the fifth winding 106e, and through the third primary node 302c to negative terminal 312n.

The sixth current passing through the first winding 106a, the second winding 106b, the sixth winding 106f, and the fifth winding 106e generates a sixth magnetic field around the first winding 106a and in the first core 108a, around the second winding 106b and in the second core 108b, around the sixth winding 106f and in the sixth core 108f, and around the fifth winding 106e and in the fifth core 108e.

The sixth magnetic field has a sixth resultant direction $\theta_6$ (e.g., a sixth net direction of magnetization). The sixth resultant direction $\theta_6$ is disposed at a sixth angle relative to the reference angle $\theta_{REF}$. In some embodiments, the sixth resultant direction $\theta_6$ is between the sixth winding 106f and the first winding 106a.

The amount of time that it takes for the sixth current to reach the second current threshold $I_{TH2}$ from the first current threshold $I_{TH1}$ is measured and recorded as $T_{\theta 6}$. $T_{\theta 6}$ may be referred to as an amount of time associated with the sixth resultant direction $\theta_6$. In some embodiments, the first transistor 310a and the sixth transistor 310f are turned off in response to the sixth current reaching the second current threshold $I_{TH2}$.

In some embodiments, after measuring each of the times $T_{\theta 1}$-$T_{\theta 6}$, the times $T_{\theta 1}$-$T_{\theta 6}$ are ranked from shortest to longest (e.g., by the rotor position detection circuitry 114 of FIGS. 1, 3A, and 3B). In some embodiments, the shortest time and the resultant direction of magnetization associated with the shortest time are determined. The shorter time of the two times respectively associated with the two resultant directions that are adjacent to the resultant direction associated with the shortest amount of time (e.g., referred to as the shorter of the two adjacent times) and associated angle are determined. The longer time of the two times respectively associated with the two resultant directions that are adjacent to the resultant direction associated with the shortest amount of time (e.g., referred to as the longer of the two adjacent times) and angle are determined. In this example, $T_{\theta 1}$ is identified as the shortest time and has an associated resultant direction of $\theta_1$, $T_{\theta 2}$ is identified as the shorter of the two adjacent times and has an associated resultant direction of $\theta_2$, and $T_{\theta 6}$ is identified as the longer of the two adjacent times and has an associated resultant direction of $\theta_6$.

In this example, $T_{\theta 1}$ is the shortest time because the direction of the magnetic field of the rotor is most closely aligned with the magnetic field generated by the stator when current is passed from the first primary node 302a to the second primary node 302b at the first time T1. In other words, $T_{\theta 1}$ is the shortest time because the pole of the rotor having the first polarity is most closely aligned with $\theta_1$. Further, $T_{\theta 2}$ is identified as the shorter of the two adjacent times because the pole of the rotor having the first polarity is second most closely aligned with $\theta_2$, and $T_{\theta 6}$ is identified as the longer of the two adjacent times because the pole of the rotor having the first polarity is third most closely aligned with $\theta_6$.

In some embodiments, the angular position of the rotor $\theta_R$ at standstill is determined based off the shortest time (e.g., $T_{\theta 1}$) and the shorter of the two adjacent times (e.g., $T_{\theta 2}$). This determination method gives the angular position of the rotor $\theta_R$ at standstill within a 30 degree range. For example, the shortest time (e.g., $T_{\theta 1}$) dictates which of the resultant directions $\theta_1$-$\theta_6$ the direction of the magnetic field of the rotor is most closely aligned with. Based on that information, the angular position of the rotor $\theta_R$ can be determined within a 60 degree range (e.g., because the windings and respective cores are 60 degrees apart). Then, the shorter of the two adjacent times (e.g., $T_{\theta 2}$) dictates which of the angular positions $\theta_1$-$\theta_6$ the direction of the magnetic field of the rotor is second most closely aligned with, which narrows the determination of the angular position of the rotor $\theta_R$ down from the 60 degree range to a 30 degree range. Thus, the accuracy of the determination of the angular position of the rotor $\theta_R$ may be improved and hence a performance of the BLDC startup operation may be improved.

In some other embodiments, the angular position of the rotor $\theta_R$ at standstill is determined by interpolating a plurality of times and associated angles between the two shortest times and their two associated angles based on the three shortest times and their three associated angles. The angular position of the rotor $\theta_R$ at standstill is further determined by analyzing the interpolated times and angles to determine the overall lowest time and associated angle of the interpolated times and angles. This method determines the angular position of the rotor with an accuracy that is within 30 degrees.

For example, the angular position of the rotor $\theta_R$ may be determined by determining a position detection value based on the three shortest times, and by inputting the rotor position detection value into an interpolation function (e.g., that is performed by the rotor position detection circuitry 114 of FIGS. 1, 3A, and 3B) that outputs the angular position of the rotor $\theta_R$ relative to the resultant direction associated with the shortest time. In the example illustrated in FIGS. 3A, 3B, and 4, the position detection value would be determined based on $T_{\theta 1}$, $T_{\theta 2}$, and $T_{\theta 6}$, and the position detection value would be input into the interpolation function to determine the angular position of the rotor $\theta_R$ relative to $\theta_1$.

In some embodiments, the determination of the angular position of the rotor $\theta_R$ using this interpolation function may have an accuracy of within about a 10 degree range, such as within 5 degree range, within a 1 degree range, or some other suitable range. Thus, by using the interpolation function to determine the angular position of the rotor $\theta_R$, an accuracy of the determination may be improved. As a result, a performance and/or reliability of startup may be improved.

In some embodiments, the 10 degree range of error or less may, for example, be due to some errors or inaccuracies associated with the timing of the currents (e.g., due to some limitations of metering circuitry 112 of FIGS. 1, 3A, and 3B). Further, currents having magnitudes that are small enough so the rotor 104 will not rotate in response to the currents to prevent the rotor 104 from rotating prior to start-up, and these small currents may provide less accurate times than would larger currents.

Although the first current threshold $I_{TH1}$ is illustrated as a non-zero threshold, it will be appreciated that in some embodiments, the first current threshold $I_{TH1}$ may be set to zero.

Further, although the shortest time and adjacent times are utilized to determine the rotor position in some embodiments of the method described above, in some other embodiments, the method may alternatively utilize the longest time and adjacent times. For example, in some other embodiments, the longest time and the resultant direction of magnetization associated with the longest time are determined. The longer time of the two times respectively associated with the two resultant directions that are adjacent to the resultant direction associated with the longest amount of time (e.g., referred to as the longer time of the two adjacent times) and associated angle are determined. The shorter time of the two times respectively associated with the two resultant directions that are adjacent to the resultant direction associated with the longest amount of time (e.g., referred to as the shorter time of the two adjacent times) and angle are determined.

Figure 5:
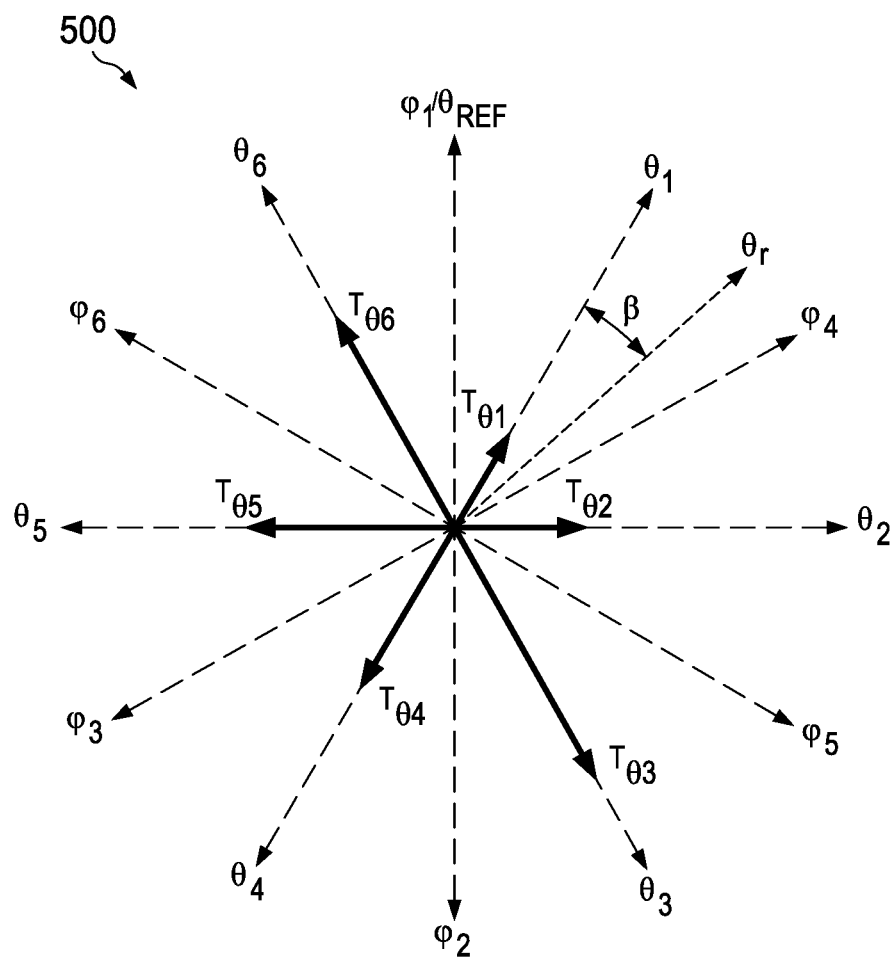
FIG. 5 is a vector diagram associated with the timing diagram of FIG. 4.

FIG. 5 is a vector diagram 500 associated with the timing diagram of FIG. 4. For example, FIG. 5 illustrates the amounts of time $T_{\theta1}$-$T_{\theta6}$ and associated resultant directions of magnetization $\theta_1$-$\theta_6$ of FIGS. 3A and 4.

As seen in FIG. 5, time $T_{\theta1}$ is the shortest time. As discussed above, $T_{\theta1}$ is the shortest because the angle associated with $T_{\theta1}$ most closely aligns with the angular position of the rotor $\theta_R$. Time $T_{\theta2}$ is the next shortest because $\theta_2$ second most closely aligns with angular position of the rotor $\theta_R$, time $T_{\theta6}$ is next shortest, and so on.

In some embodiments, an angle β exists between $T_{\theta1}$ and $\theta_R$. In some embodiments, the angle β is relative to the angle associated with the shortest time and is measured in the direction of the angle associated with the shorter of the two adjacent times. In other words, in this example, β is an angle with respect to $\theta_1$ in the direction of $\theta_2$ (e.g., in the clockwise direction). In some other examples (e.g., if $T_{\theta6}$ were the shorter of the two adjacent times instead of $T_{\theta2}$), β may be an angle with respect to $\theta_1$ in the direction of $\theta_6$ (e.g., the counterclockwise direction).

In some embodiments, the following equations (e.g., equations (2)-(5)) may be used to determine β.

$$L_m = L_0 + L_1 \cos(2\beta°) \tag{2}$$

$$L_{nm} = L_0 + L_1 \cos(2\beta° + 120°) \tag{3}$$

$$L_{nnm} = L_0 + L_1 \cos(2\beta° - 120°) \tag{4}$$

$$Vdc = L\frac{\Delta i}{T} \tag{5}$$

where $L_m$ is the inductance of the winding having the lowest inductance, where $L_0$ is $$\frac{(L_d + L_q)}{2},$$

where $L_1$ is $$\frac{(L_d - L_q)}{2},$$

where $L_d$ is a d-axis inductance, where $L_q$ is a q-axis inductance, where β is an angular position of the rotor with relative to the resultant direction of magnetization of a magnetic field produced by the current associated with the shortest amount of time, where $L_{nm}$ is the inductance of the winding having the lesser inductance of the two windings that are adjacent to the winding having the lowest inductance, where $L_{nnm}$ is the inductance of the winding having the greater inductance of the two windings that are adjacent to the winding having the lowest inductance, where Vdc is the bus voltage of the BLDC motor, where L is the inductance of a winding, and where ΔI is a difference in current over a time T.

For example, $L_0$, $L_1$, and β are unknowns, Vdc is constant, ΔI is the difference between the second current threshold $I_{TH2}$ and the first current threshold $I_{TH1}$, which is constant, and T is the time taken for a current to reach second current threshold from the first current threshold.

Next, since Vdc and ΔI are held constant, the following equation can be derived:

$$\frac{\Delta i}{Vdc} = \frac{T_m}{L_m} = \frac{T_{nm}}{L_{nm}} = \frac{T_{nnm}}{L_{nnm}} = k \tag{6}$$

where $T_m$ is the shortest amount time taken for a current to reach the second threshold from the first threshold (e.g., $T_{\theta1}$), $T_{nm}$ is the shorter of the two adjacent times (e.g., $T_{\theta2}$), $T_{nnm}$ is the longer of the two adjacent times (e.g., $T_{\theta6}$), and k is some constant.

Next, using equation (6), it is possible to solve for $T_m$, $T_{nm}$, and $T_{nnm}$:

$$T_m = kL_m \tag{7}$$

$$T_{nm} = kL_{nm} \tag{8}$$

$$T_{nnm} = kL_{nnm} \tag{9}$$

Next, substituting for $L_m$, $L_{nm}$, and $L_{nnm}$:

$$T_m = k(L_0 + L_1 \cos(2\beta°)) \tag{10}$$

$$T_{nm} = k(L_0 + L_1 \cos(2\beta° + 120°)) \tag{11}$$

$$T_{nnm} = k(L_0 + L_1 \cos(2\beta° - 120°)) \tag{12}$$

Next, by relating equations (10) through (12) to cancel like terms, a function of β (e.g., the interpolation function) can be derived:

$$\frac{Tm - Tnm}{Tm - Tnnm} = \frac{k[L_0 + L_1\cos(2\beta°)] - k[L_0 + L_1\cos(2\beta° + 120°)]}{k[L_0 + L_1\cos(2\beta°)] - k[L_0 + L_1\cos(2\beta° - 120°)]} = \tag{13}$$

$$\frac{\cos(2\beta°) - \cos(2\beta° + 120°)}{\cos(2\beta°) - \cos(2\beta° - 120°)} = \frac{-\sin(2\beta° - 60°)}{\sin(2\beta° + 60°)} = f(\beta°)$$

where $$\frac{Tm - Tnm}{Tm - Tnnm}$$

is the position detection value.

A linear interpolation function that is a linear approximation of the interpolation function (e.g., equation (13)) may alternatively be used:

$$f_{linear}(\beta°) = \frac{Tm - Tnm}{Tm - Tnnm} = -.032(\beta°) + .9806 \tag{14}$$

The linear interpolation function (e.g., equation (14)) may then be rearranged to solve for β.

$$\beta° = 30.64375 - 31.25 * \left(\frac{Tm - Tnm}{Tm - Tnnm}\right) \tag{15}$$

Thus, by using the three shortest times $T_m$ (e.g., $T_{\theta1}$), $T_{nm}$ (e.g., $T_{\theta2}$), and $T_{nnm}$ (e.g., $T_{\theta6}$) to determine the position detection value and solving for β, the angular position of the rotor $\theta_R$ relative to the angle associated with the shortest time $T_m$ (e.g., $\theta_1$) can be determined (e.g., β can be determined). For example, in some embodiments the position detection value may be multiplied by a first constant (e.g., 31.25) and the product of that multiplication may be subtracted from a second constant (e.g., 30.64375) to determine an adjustment value that may be added or subtracted from a position (e.g., angle) associated with the shortest time to determine the rotor position. It should be noted that equations (13), (14), and (15) are just examples of equations that can be used to determine the position of the rotor. Other equations can be derived from equations (2) through (5) that are also feasible to solve for β. In some embodiments, the rotor position detection value is a constant between 0 and 1 and β is an angle between 0 and 30 degrees.

Figure 6:
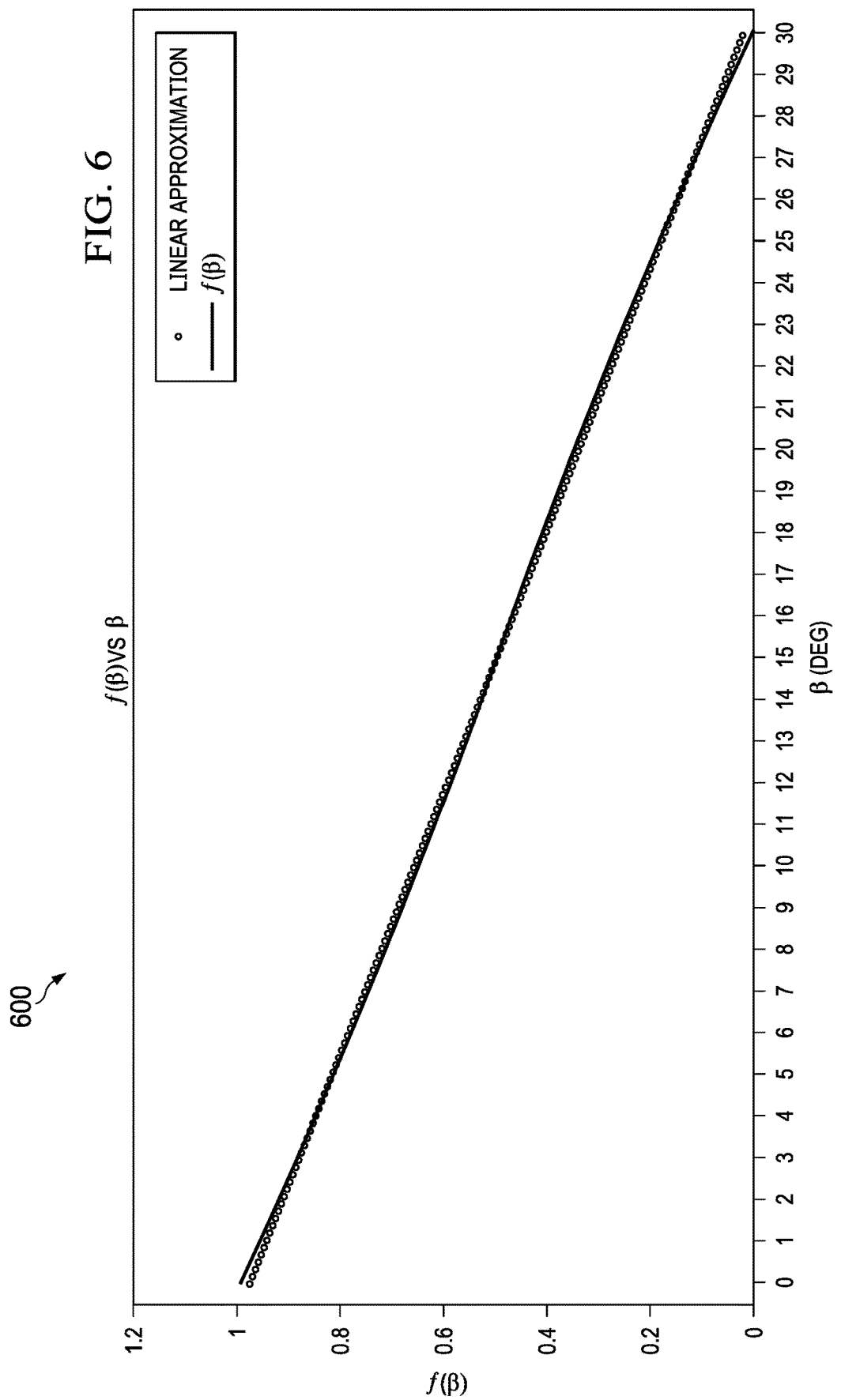
FIG. 6 is a graph of a function for determining an angular position of a rotor of a BLDC motor.

FIG. 6 is a graph 600 of a function for determining an angular position of a rotor of a BLDC motor.

The graph 600 illustrates the interpolation function discussed above (e.g., $f(\beta)$ versus $\beta$) over a domain of 0 to 30 degrees. The domain is set to 30 degrees because, as discussed above, by using the shortest time (e.g., $T_{\theta 1}$) and the shorter of the two adjacent times (e.g., $T_{\theta 2}$), the angular position of the rotor $\theta_R$ can be determined within a 30 degree range. Thus, by limiting the interpolation function to the 30 degree domain, the specific angle within the 30 degree range can be determined using the interpolation function.

The graph also illustrates a linear approximation (e.g., equation (14)) of the interpolation function $f(\beta)$ over the same 30 degree range. In some embodiments, the linear approximation is derived from a line of best fit. In some embodiments, a linear approximation of the interpolation function is beneficial because a linear function may be much easier to implement in hardware (e.g., in the rotor position detection circuitry 114 of FIGS. 1, 3A and 3B) than a function containing sine and/or cosine. Thus, by using the linear approximation to determine the position of the rotor, the hardware requirements needed to solve for β can be reduced. In other words, the rotor position detection circuitry 114 of FIGS. 1, 3A, and 3B may require less components and may perform the calculation more accurately and/or quickly. Thus, in some embodiments, the position detection value is an input into the linear interpolation function (e.g., equation (14) or equation (15)) that outputs the angular position of rotor relative to a resultant direction of magnetization of a magnetic field produced by the current associated with the shortest amount of time.

FIG. 7 is a timing diagram 700 of some alternative embodiments of a method for determining an angular position of a rotor of a BLDC motor at standstill. For example, the timing diagram 700 comprises graphs 700a-700f of the states of the first transistor 310a of FIG. 3B through the sixth transistor 310f of FIG. 3B, respectively, over time. The timing diagram 700 also comprises a graph 700g of the currents passing through the windings of the BLDC motor over time (e.g., the currents measured by the metering circuitry 112 of FIGS. 3A and 3B over time).

The method illustrated in the timing diagram 700 of FIG. 7 is similar to the method illustrated in the timing diagram 400 of FIG. 4. However, instead of measuring amounts of time taken for currents to reach a second current threshold from a first current threshold, the method illustrated in FIG. 7 relies on measuring (e.g., via the metering circuitry 112 of FIGS. 3A and 3B) the magnitudes (e.g., $I_{\theta 1}$-$I_{\theta 6}$) of the currents after a fixed predetermined amount of time $T_P$ and determining (e.g., via the RPD circuitry 114) which of the magnitudes are greatest, the greater of the two magnitudes that are adjacent to the greatest magnitude, and the lesser of the two magnitudes that are adjacent to the greatest magnitude. In some embodiments, the angular position of the rotor is determined based on the greatest current magnitude after the fixed amount of time, the greater current magnitude of the two current magnitudes that adjacent to the greatest current magnitude, and the lesser current magnitude of the two current magnitudes that are adjacent to the greatest current magnitude. In some other embodiments, the angular position of the rotor is determined based on the lowest current magnitude after the fixed amount of time, the lesser current magnitude of the two current magnitudes that are adjacent to the lowest current magnitude, and the greater current magnitude of the two current magnitudes that are adjacent to the lowest current magnitude.

For example, a position detection value is determined based on the three largest currents after the fixed amount of time, and an angular position of the rotor is determined based on the position detection value. In some embodiments, the position detection value is an input into an interpolation function or a linear approximation of the interpolation function that outputs the angular position of rotor relative to a resultant direction of magnetization of a magnetic field produced by the current having the greatest magnitude after the fixed amount of time.

In some embodiments, using equations (2) through (5) above, the following interpolation function can be derived:

$$\frac{\frac{1}{I_m} - \frac{1}{I_{nm}}}{\frac{1}{I_m} - \frac{1}{I_{nnm}}} = \frac{-\sin(2\beta° - 60°)}{\sin(2\beta° + 60°)} = f(\beta°) \quad (16)$$

where $I_m$ is the greatest of the current magnitudes after the fixed amount of time, $I_{nm}$ is the greater current magnitude of the two adjacent current magnitudes after the fixed amount of time, and $I_{nnm}$ is the lesser current magnitude of the two adjacent current magnitudes after the fixed amount of time, where $$\frac{\frac{1}{I_m} - \frac{1}{I_{nm}}}{\frac{1}{I_m} - \frac{1}{I_{nnm}}}$$

is the position detection value, β is the angle of the rotor relative to a resultant direction of magnetization of a magnetic field produced by the current having the greatest magnitude after the fixed amount of time. In some embodiments, a linear interpolation function (e.g., similar to equation (14) and/or equation (15)) may alternatively be used to determine the angular position of the rotor.

In the example illustrated in FIG. 7, a rotor is positioned at a same or similar position as illustrated in FIGS. 3A and 5. The first current has a first magnitude $I_{\theta 1}$ after the fixed amount of time, the second current has a second magnitude $I_{\theta 2}$ after the fixed amount of time, and so on. In this example, the first magnitude $I_{\theta 1}$ is greatest after the fixed amount of time because the rotor is most closely aligned with the resultant direction of magnetization produced by the first current (e.g., $\theta_1$), $I_{\theta 2}$ is the greater of the two adjacent current magnitudes, and $I_{\theta 6}$ is the lesser of the two adjacent current magnitudes.

Figure 8A:
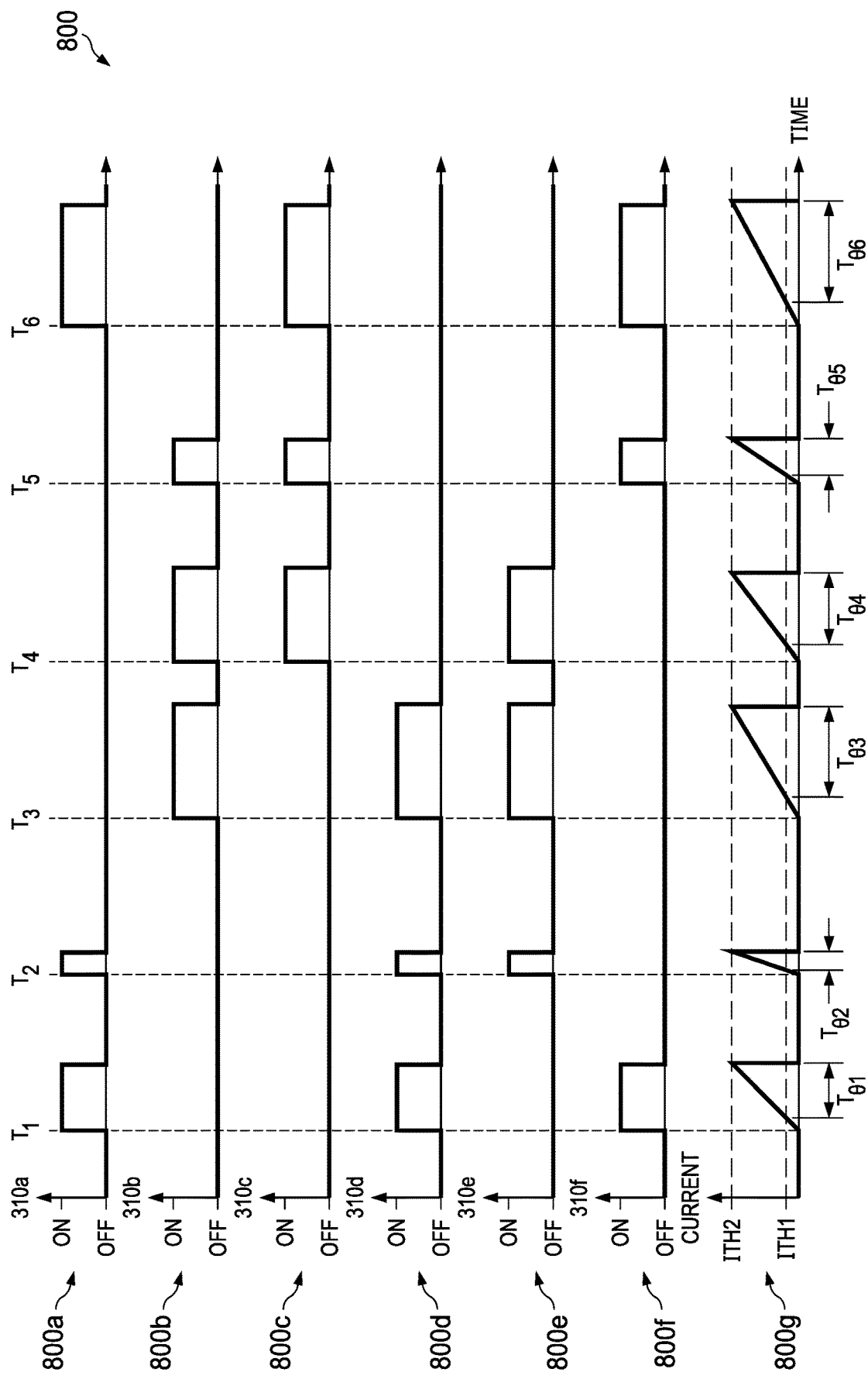
FIG. 8A is a timing diagram of some other alternative embodiments of a method for determining an angular position of a rotor of a BLDC motor at standstill.
Figure 8B:
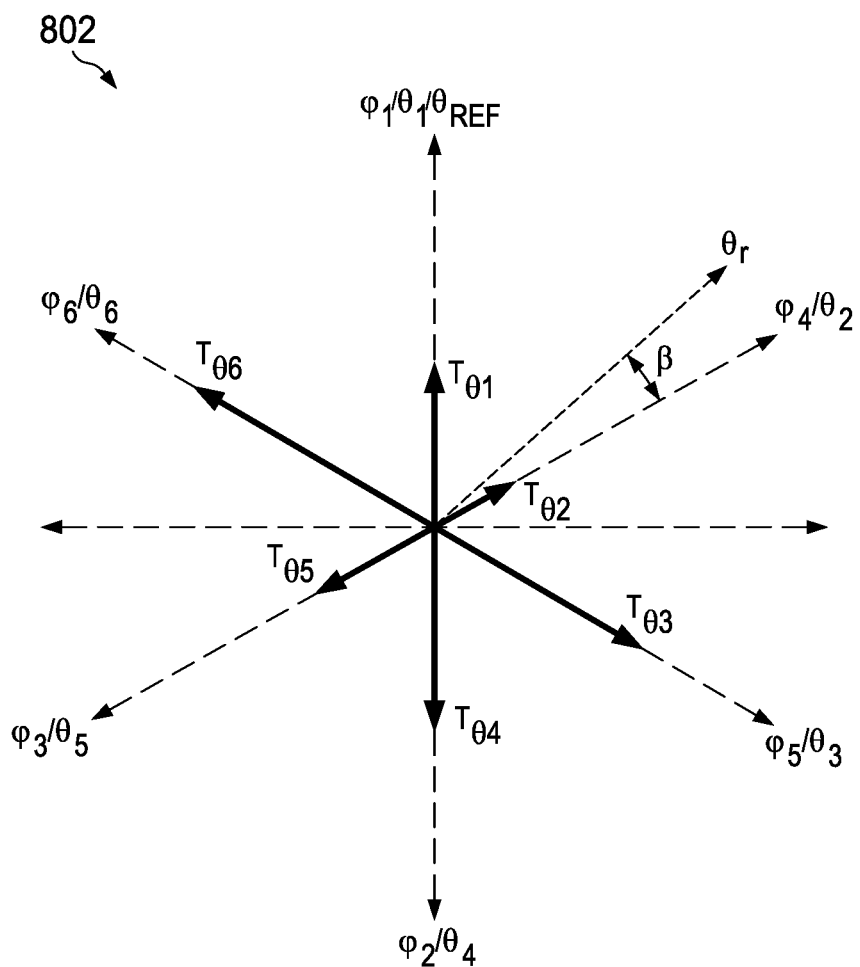
FIG. 8B is a vector diagram associated with the timing diagram of FIG. 8A.

Referring to FIGS. 8A and 8B simultaneously, FIG. 8A is a timing diagram 800 of some other alternative embodiments of a method for determining an angular position $\theta_R$ of a rotor of a BLDC motor at standstill, and FIG. 8B is a vector diagram 802 associated with the timing diagram of FIG. 8A. For example, the timing diagram 800 comprises graphs 800a-800f of the states of the first transistor 310a of FIG. 3B through the sixth transistor 310f of FIG. 3B, respectively, over time. The timing diagram 800 also comprises a graph 800g of the currents passing through the windings of the BLDC motor over time (e.g., the currents measured by the metering circuitry 112 of FIGS. 3A and 3B over time).

The method is similar to that illustrated in the timing diagram 400 of FIG. 4. However, instead of applying voltage across two phases of the stator to generate current pulses, the method illustrated in FIGS. 8A and 8B relies on applying voltage across three phases of the stator to generate the current pulses.

For example, at a first time T1, the first transistor 310a is turned on, the fourth transistor 310d is turned on, and the sixth transistor 310f is turned on (e.g., by the switch driver circuitry 316 of FIG. 3B) so the positive voltage terminal 312p is applied to the first primary node 302a and the negative voltage terminal 312n is applied to both the second primary node 302b and the third primary node 302c. As a result, a first current is passed from the positive terminal 312p through the first primary node 302a, through the first winding 106a, through the first intermediate node 304a, and through the second winding 106b to the neutral node 306. From the neutral node, the first current is divided into two portions. A first portion of the first current is passed from the neutral node 306 through the fourth winding 106d, through the second intermediate node 304b, through the third winding 106c, and through the second primary node 302b to the negative terminal 312n. A second portion of the first current is passed from the neutral node 306 through the sixth winding 106f, through the third intermediate node 304c, through the fifth winding 106e, and through the third primary node 302c to the negative terminal 312n.

The first current passing through the first winding 106a, the second winding 106b, the fourth winding 106d, the third winding 106c, the sixth winding 106f and the fifth winding 106e generates a first magnetic field around the aforementioned windings and in their respective cores.

The first magnetic field has a first resultant direction $\theta_1$ (e.g., a first net direction of magnetization), as shown in FIG. 8B. The first resultant direction $\theta_1$ is disposed at a first angle relative to a reference angle $\theta_{REF}$. In some embodiments, the first resultant direction $\theta_1$ is aligned with the angular position $\varphi_1$ of the first winding 106a and first core 108a.

The amount of time that it takes for the first current to reach the second current threshold $I_{TH2}$ from the first current threshold $I_{TH1}$ is measured and recorded as $T_{\theta 1}$.

At a second time T2, the first transistor 310a is turned on, the fourth transistor 310d is turned on, and the fifth transistor 310e is turned on (e.g., by the switch driver circuitry 316 of FIG. 3B) so the positive voltage terminal 312p is applied to the first primary node 302a and the third primary node 302c, while the negative voltage terminal 312n is applied to the second primary node 302b. As a result, a first portion of a second current is passed from the positive terminal 312p through the third primary node 302c, through the fifth winding 106e, through the third intermediate node 304c, and through the sixth winding 106f to the neutral node 306. A second portion of the second current is passed from the positive terminal 312p through the first primary node 302a, through the first winding 106a, through the first intermediate node 304a, through the second winding 106b to the neutral node 306 where the second portion and the first portion are combined. The second current (e.g., the combined first portion and second portion) is passed from the neutral node 306 through the fourth winding 106d, through the second intermediate node 304b, through the third winding 106c, and through the second primary node 302b to the negative terminal 312n.

The second current passing through the first winding 106a, the second winding 106b, the fifth winding 106e, the sixth winding 106f, the fourth winding 106d, and the third winding 106c generates a second magnetic field around the aforementioned windings and in their respective cores.

The second magnetic field has a second resultant direction $\theta_2$ (e.g., a second net direction of magnetization), as shown in FIG. 8B. The second resultant direction $\theta_2$ is disposed at a second angle relative to the reference angle $\theta_{REF}$. In some embodiments, the second resultant direction $\theta_2$ is aligned with the angular position $\varphi_4$ of the fourth winding 106d and the fourth core 108d.

The amount of time that it takes for the second current to reach the second current threshold $I_{TH2}$ from the first current threshold $I_{TH1}$ is measured and recorded as $T_{\theta 2}$.

At a third time T3, the second transistor 310b is turned on, the fourth transistor 310d is turned on, and the fifth transistor 310e is turned on (e.g., by the switch driver circuitry 316 of FIG. 3B) so the positive voltage terminal 312p is applied to the third primary node 302c while the negative voltage terminal 312n is applied to both the first primary node 302a and the second primary node 302b. As a result, a third current is passed from the positive terminal 312p through the third primary node 302c, through the fifth winding 106e, through the third intermediate node 304c, and through the sixth winding 106f to the neutral node 306. From the neutral node 306, the third current is divided into two portions. A first portion of the third current is passed from the neutral node 306 through the second winding 106b, through the first intermediate node 304a, through the first winding 106a, and through the first primary node 302a to the negative terminal 312n. A second portion of the third current is passed from the neutral node 306 through the fourth winding 106d, through the second intermediate node 304b, through the third winding 106c, and through the second primary node 302b to the negative terminal 312n.

The third current passing through the fifth winding 106e, the sixth winding 106f, the second winding 106b, the first winding 106a, the fourth winding 106d, and the third winding 106c generates a third magnetic field around the aforementioned windings and in their respective cores.

The third magnetic field has a third resultant direction $\theta_3$ (e.g., a third net direction of magnetization), as shown in FIG. 8B. The third resultant direction $\theta_3$ is disposed at a third angle relative to the reference angle $\theta_{REF}$. In some embodiments, the third resultant direction $\theta_3$ is aligned with the angular position $\varphi_6$ of the fifth winding 106e and the fifth core 108e.

The amount of time that it takes for the third current to reach the second current threshold $I_{TH2}$ from the first current threshold $I_{TH1}$ is measured and recorded as $T_{\theta 3}$. In some embodiments, the second transistor 310b and the fifth transistor 310e are turned off in response to the third current reaching the second current threshold $I_{TH2}$.

At a fourth time T4, the second transistor 310b is turned on, the third transistor 310c is turned on, and the fifth transistor 310e is turned on (e.g., by the switch driver circuitry 316 of FIG. 3B) so the positive voltage terminal 312p is applied to both the second primary node 302b and the third primary node 302c, while the negative voltage terminal 312n is applied to the first primary node 302a. As a result, a first portion of a fourth current is passed from the positive terminal 312p through the second primary node 302b, through the third winding 106c, through the second intermediate node 304b, and through the fourth winding 106d to the neutral node 306. A second portion of the fourth current is passed from the positive terminal 312p through the third primary node 302c, through the fifth winding 106e, through the third intermediate node 304c, and through the sixth winding 106f to the neutral node 306. The fourth current (e.g., the combined first portion and second portion) is passed from the neutral node 306 through the second winding 106b, through the first intermediate node 304a, through the first winding 106a, and through the first primary node 302a to the negative terminal 312n.

The fourth current passing through the third winding 106c, the fourth winding 106d, the fifth winding 106e, the sixth winding 106f, the second winding 106b, and the first winding 106a generates a fourth magnetic field around the aforementioned windings and in their respective cores.

The fourth magnetic field has a fourth resultant direction $\theta_4$ (e.g., a fourth net direction of magnetization), as shown in FIG. 8B. The fourth resultant direction $\theta_4$ is disposed at a fourth angle relative to the reference angle $\theta_{REF}$. In some embodiments, the fourth resultant direction $\theta_4$ is aligned with the angular position $\varphi_2$ of the second winding 106b and the second core 108b.

The amount of time that it takes for the fourth current to reach the second current threshold $I_{TH2}$ from the first current threshold $I_{TH1}$ is measured and recorded as $T_{\theta 4}$.

At a fifth time T5, the second transistor 310b, the third transistor 310c is turned on, and the sixth transistor 310f is turned on (e.g., by the switch driver circuitry 316 of FIG. 3B) so the positive voltage terminal 312p is applied to the second primary node 302b while the negative voltage terminal 312n is applied to both the first primary node 302a and the third primary node 302c. As a result, a fifth current is passed from the positive terminal 312p through the second primary node 302b, through the third winding 106c, through the second intermediate node 304b, and through the fourth winding 106d to the neutral node 306. From the neutral node 306, the fifth current is divided into two portions. A first portion of the fifth current is passed from the neutral node 306 through the second winding 106b, through the first intermediate node 304a, through the first winding 106a, and through the first primary node to the negative terminal 312n. A second portion of the fifth current is passed from the neutral node 306 through the sixth winding 106f, through the third intermediate node 304c, through the fifth winding 106e, and through the third primary node 302c to the negative terminal 312n.

The fifth current passing through the third winding 106c, the fourth winding 106d, the second winding 106b, the first winding 106a, the sixth winding 106f, and the fifth winding 106e generates a fifth magnetic field around the aforementioned windings and in their respective cores.

The fifth magnetic field has a fifth resultant direction $\theta_5$ (e.g., a fifth net direction of magnetization), as shown in FIG. 8B. The fifth resultant direction $\theta_5$ is disposed at a fifth angle relative to the reference angle $\theta_{REF}$. In some embodiments, the fifth resultant direction $\theta_5$ is aligned with the angular position $\varphi_3$ of the third winding 106c and the third core 108c.

The amount of time that it takes for the fifth current to reach the second current threshold $I_{TH2}$ from the first current threshold $I_{TH1}$ is measured and recorded as $T_{\theta 5}$.

At a sixth time T6, the first transistor 310a is turned on, the third transistor 310c is turned on, and the sixth transistor 310f is turned on (e.g., by the switch driver circuitry 316 of FIG. 3B) so the positive voltage terminal 312p is applied to both the first primary node 302a and the second primary node 302b, while the negative voltage terminal 312n is applied to the third primary node 302c. As a result, a first portion of a sixth current is passed from the positive terminal 312p through the first primary node 302a, through the first winding 106a, through the first intermediate node 304a, and through the second winding 106b to the neutral node 306. A second portion of the sixth current is passed from the positive terminal 312p through the second primary node 302b, through the third winding 106c, through the second intermediate node 304b, and through the fourth winding 106d to the neutral node 306. The sixth current (e.g., the combined first portion and second portion) is passed from the neutral node 306 through the sixth winding 106f, through the third intermediate node 304c, through the fifth winding 106e, and through the third primary node 302c to the negative terminal 312n.

The sixth current passing through the first winding 106a, the second winding 106b, the third winding 106c, the fourth winding 106d, the sixth winding 106f, and the fifth winding 106e generates a sixth magnetic field around the aforementioned windings and in their respective cores.

The sixth magnetic field has a sixth resultant direction $\theta_6$ (e.g., a sixth net direction of magnetization), as shown in FIG. 8B. The sixth resultant direction $\theta_6$ is disposed at a sixth angle relative to the reference angle $\theta_{REF}$. In some embodiments, the sixth resultant direction $\theta_6$ is aligned with the angular position $\varphi_6$ of the sixth winding 106f and the sixth core 108f.

The amount of time that it takes for the sixth current to reach the second current threshold $I_{TH2}$ from the first current threshold $I_{TH1}$ is measured and recorded as $T_{\theta 6}$.

Similar to the method described with regard to FIGS. 4-6, the angular position of the rotor $\theta_R$ may be determined by determining a position detection value based on the three shortest times, and by inputting the position detection value into an interpolation function that outputs the angular position of the rotor $\theta_R$ relative to the resultant direction associated with the shortest time. In the example illustrated in FIGS. 8A and 8B, the shortest time, shorter of the two adjacent times, and longer of the two adjacent times are $T_{\theta 2}$, $T_{\theta 1}$, and $T_{\theta 3}$, respectively, the resultant direction associated with the shortest time is $\theta_2$, and the output of the interpolation function is $\beta$.

In some embodiments, the following interpolation function (e.g., equation (20)) may be derived from equations (17) through (19).

$$L_{eq_{nm}} = \frac{3}{2} \frac{L_0^2 - L_1^2}{L_0 - L_1 \cos\left(2\beta + \frac{2\pi}{3}\right)} \tag{17}$$

$$L_{eq_m} = \frac{3}{2} \frac{L_0^2 - L_1^2}{L_0 - L_1 \cos(2\beta)} \tag{18}$$

$$L_{eq_{nnm}} = \frac{3}{2} \frac{L_0^2 - L_1^2}{L_0 - L_1 \cos\left(2\beta - \frac{2\pi}{3}\right)} \tag{19}$$

$$\frac{\left(\frac{1}{T_m} - \frac{1}{T_{nm}}\right)}{\left(\frac{1}{T_m} - \frac{1}{T_{nnm}}\right)} = \frac{\cos(2\beta) - \cos\left(2\beta + \frac{2\pi}{3}\right)}{\cos(2\beta) - \cos\left(2\beta - \frac{2\pi}{3}\right)} = f(\beta) \tag{20}$$

where $Leq_m$ is the equivalent inductance of the winding having the lowest equivalent inductance, where $Leq_{nm}$ is the equivalent inductance of the winding having the lesser inductance of the two windings that are adjacent to the winding having the lowest equivalent inductance, and Leq$_{nnm}$ is the equivalent inductance of the winding having the greater inductance of the two windings that are adjacent to the winding having the lowest equivalent inductance, and where $$\frac{\left(\frac{1}{T_m} - \frac{1}{T_{nm}}\right)}{\left(\frac{1}{T_m} - \frac{1}{T_{nnm}}\right)}$$

is the position detection value. In some embodiments, a linear interpolation function (e.g., similar to equation (14) and/or equation (15)) may alternatively be used to determine the angular position of the rotor.

FIG. 9 is a timing diagram 900 of some other alternative embodiments of a method for determining an angular position $\theta_R$ of a rotor of a BLDC motor at standstill. For example, the timing diagram 900 comprises graphs 900a-900f of the states of the first transistor 310a of FIG. 3B through the sixth transistor 310f of FIG. 3B, respectively, over time. The timing diagram 900 also comprises a graph 900g of the currents passing through the windings of the BLDC motor over time (e.g., the currents measured by the metering circuitry 112 of FIGS. 3A and 3B over time).

The method illustrated in the timing diagram 900 of FIG. 9 is similar to the method illustrated in the timing diagram 800 of FIG. 8A. However, instead of measuring amounts of time taken for currents to reach a second current threshold from a first current threshold, the method illustrated in FIG. 9 relies on measuring the magnitudes of the currents after a fixed amount of time (e.g., similar to the method described with regard to FIG. 7). In some embodiments, the position of the rotor is determined based on the greatest current magnitude after the fixed amount of time, the greater of the two adjacent magnitudes after the fixed amount of time, and the lesser of the two adjacent magnitudes after the fixed amount of time (e.g., as discussed above with regard to FIG. 7).

Figure 10:
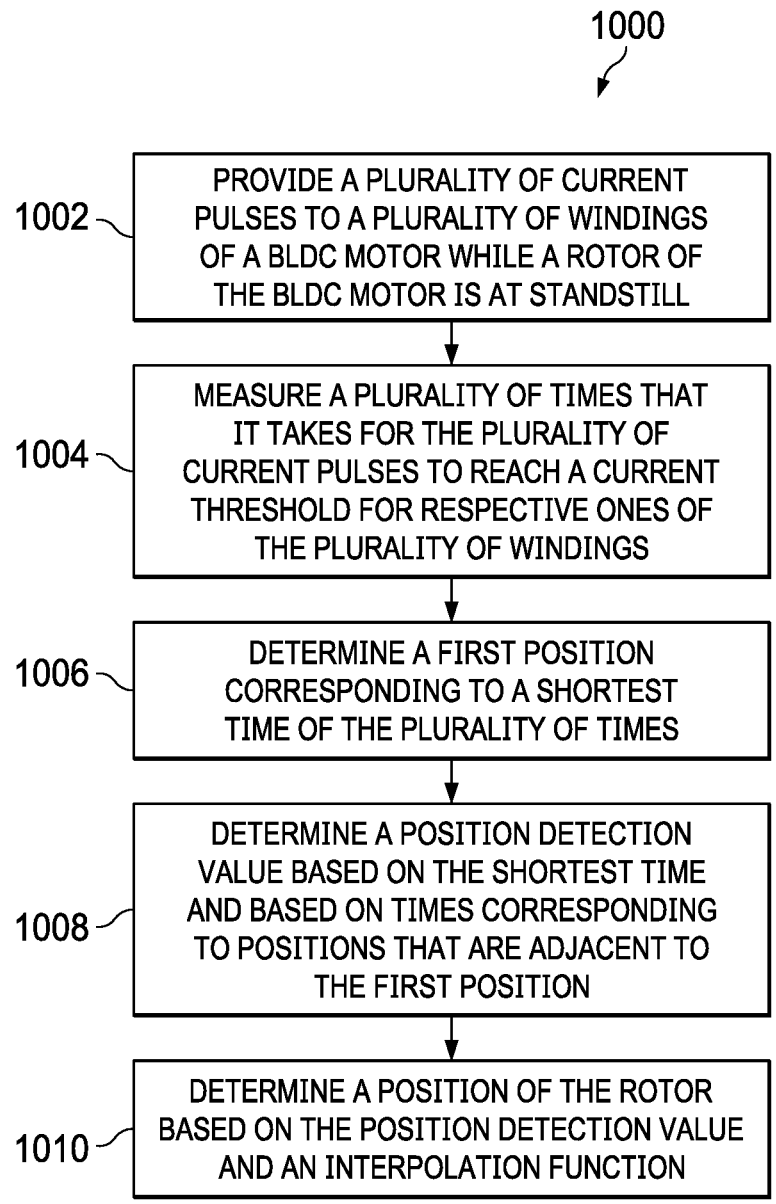
FIGS. 10 and 11 are flow diagrams of some embodiments of methods for determining an angular position of a rotor of a BLDC motor at standstill.

FIG. 10 is a flow diagram of some embodiments of a method 1000 for determining an angular position of a rotor of a BLDC motor at standstill. In some embodiments, FIGS. 4-6, 8A, and 8B and their associated descriptions correspond to the method 1000 of FIG. 10.

At 1002, provide a plurality of current pulses to a plurality of windings of a BLDC motor while a rotor of the BLDC motor is at standstill. For example, stator control circuitry (e.g., 110 of FIGS. 1, 3A, and 3B) may be configured to provide the plurality of current pulses to the plurality of windings of the BLDC motor.

At 1004, measure a plurality of times that it takes for the plurality of current pulses to reach a current threshold for respective ones of the plurality of windings. For example, metering circuitry (e.g., 112 of FIGS. 1, 3A, and 3B) may be configured to measure the plurality of current pulses and may be further configured to measure the plurality of times taken for the plurality of current pulses to reach a second current threshold from a first current threshold.

At 1006, determine a first position corresponding to a shortest time of the plurality of times. For example, rotor position detection circuitry (e.g., 114 of FIGS. 1, 3A, and 3B) may be configured to determine the first position based on the measured times.

At 1008, determine a position detection value based on the shortest time and based on times corresponding to positions that are adjacent to the first position. For example, the rotor position detection circuitry (e.g., 114 of FIGS. 1, 3A, and 3B) may be configured to determine the position detection value (see, for example, equations (13)-(15)).

At 1010, determine a position of the rotor based on the position detection value and an interpolation function. For example, the rotor position detection circuitry (e.g., 114 of FIGS. 1, 3A, and 3B) may be configured to determine the position of the rotor based on the position detection value (see, for example, equations (13)-(15)). In some embodiments, determining the position of the rotor may be further based on the angle associated with the shortest amount of time (e.g., the first position). In some embodiments, the determined position of the rotor may be the angular position of the rotor relative to a resultant direction of magnetization of a magnetic field produced by a current pulse of the plurality of current pulses associated with the shortest amount of time.

Figure 11:
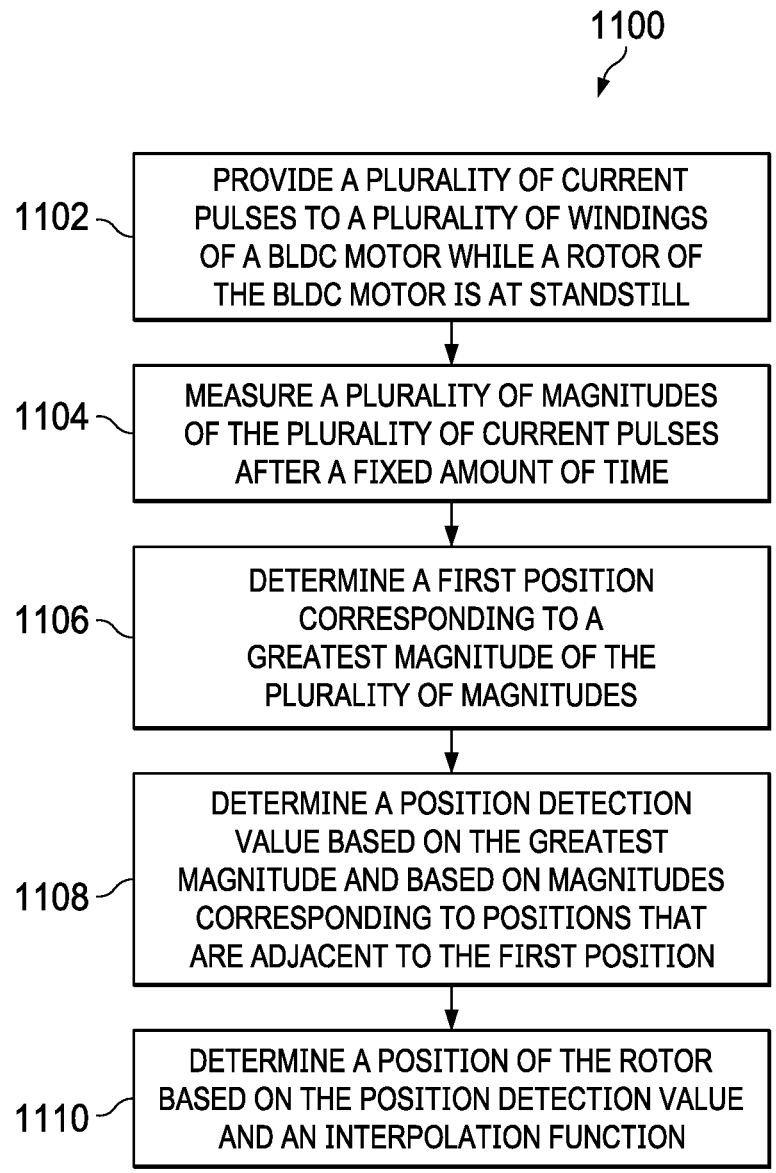

FIG. 11 is a flow diagram of some other embodiments of a method 1100 for determining an angular position of a rotor of a BLDC motor at standstill. In some embodiments, FIGS. 7 and 9 and their associated descriptions correspond to the method 1100 of FIG. 11.

At 1102, provide a plurality of current pulses to a plurality of windings of a BLDC motor while a rotor of the BLDC motor is at standstill. For example, stator control circuitry (e.g., 110 of FIGS. 1, 3A, and 3B) may be configured to provide the plurality of current pulses to the plurality of windings of the BLDC motor.

At 1104, measure a plurality of magnitudes of the plurality of current pulses after a fixed amount of time. For example, metering circuitry (e.g., 112 of FIGS. 1, 3A, and 3B) may be configured to set the fixed amount of time and the metering circuitry may be further configured to measure the plurality of magnitudes of the plurality of current pulses after the fixed amount of time.

At 1106, determine a first position corresponding to a greatest magnitude of the plurality of magnitudes. For example, rotor position detection circuitry (e.g., 114 of FIGS. 1, 3A, and 3B) may be configured to determine the first position based on the measured magnitudes.

At 1108, determine a position detection value based on the greatest magnitude and based on magnitudes corresponding to positions that are adjacent to the first position. For example, the rotor position detection circuitry (e.g., 114 of FIGS. 1, 3A, and 3B) may be configured to determine the position detection value.

At 1110, determine a position of the rotor based on the position detection value and an interpolation function. For example, the rotor position detection circuitry (e.g., 114 of FIGS. 1, 3A, and 3B) may be configured to determine the position of the rotor based on the position detection value (see, for example, equation (16)). In some embodiments, determining the position of the rotor may be further based on the angle associated with a current pulse of the plurality of current pulses having the greatest magnitude after the fixed amount of time (e.g., the first position). In some embodiments, the determined position of the rotor may be the angular position of the rotor relative to a resultant direction of magnetization of a magnetic field produced by the current pulse having the greatest magnitude after the fixed amount of time.

Thus, the present description relates to a method for determining an angular position of a rotor of a sensor-less BLDC motor at standstill with improved accuracy.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other implementations are possible, within the scope of the claims.

What is claimed is:

1. A method comprising:
   providing a plurality of current pulses to a plurality of windings of a motor having a rotor at a standstill position, including providing a first current pulse to a first winding, providing a second current pulse to a second winding, providing a third current pulse to a third winding, providing a fourth current pulse to a fourth winding, providing a fifth current pulse to a fifth winding, and providing a sixth current pulse to a sixth winding;
   measuring a plurality of times that it takes for the plurality of current pulses to reach a threshold for respective ones of the plurality of windings, including measuring a first time that it takes for the first current pulse to reach the threshold, measuring a second time that it takes for the second current pulse to reach the threshold, measuring a third time that it takes for the third current pulse to reach the threshold, measuring a fourth time that it takes for the fourth current pulse to reach the threshold, measuring a fifth time that it takes for the fifth current pulse to reach the threshold, and measuring a sixth time that it takes for the sixth current pulse to reach the threshold;
   determining a first position corresponding to a shortest time of the plurality of times;
   determining a position detection value based on the shortest time and based on times of the plurality of times corresponding to positions that are adjacent to the first position; and
   determining a position of the rotor at the standstill position based on the position detection value and an interpolation function.

2. The method of claim 1, wherein determining the position of the rotor comprises inputting the position detection value into the interpolation function, wherein the interpolation function outputs an angular adjustment value, and wherein the position of the rotor is determined based on the angular adjustment value.

3. The method of claim 2, wherein the interpolation function is linear, wherein the angular adjustment value is an angle between 0 and 30 degrees.

4. The method of claim 1, further comprising:
   determining which one of the first time through the sixth time is the shortest time;
   determining which two times of the first time through the sixth time correspond to positions that are adjacent to the first position; and determining which of the two times is shortest and which is longest.

5. The method of claim 4, wherein the interpolation function is linear, wherein determining the position of the rotor comprises inputting the position detection value into the interpolation function which outputs an angular position of a pole of the rotor relative to the first position.

6. The method of claim 1, wherein the position detection value is a constant.

7. The method of claim 1, wherein current magnitudes of the plurality of current pulses are low enough so the rotor will not rotate in response to the plurality of current pulses being provided to the plurality of windings.

8. A method comprising:
providing a plurality of current pulses to a plurality of windings of a motor having a rotor at a standstill position, including providing a first current pulse to a first winding, providing a second current pulse to a second winding, providing a third current pulse to a third winding, providing a fourth current pulse to a fourth winding, providing a fifth current pulse to a fifth winding, and providing a sixth current pulse to a sixth winding;
measuring a plurality of current magnitudes for each of the plurality of windings after a fixed amount of time, including measuring the plurality of current magnitudes of the plurality of current pulses after the fixed amount of time comprises measuring a first current magnitude of the first current after the fixed amount of time, measuring a second current magnitude of the second current after the fixed amount of time, measuring a third current magnitude of the third current after the fixed amount of time, measuring a fourth current magnitude of the fourth current after the fixed amount of time, measuring a fifth current magnitude of the fifth current after the fixed amount of time, and measuring a sixth current magnitude of the sixth current after the fixed amount of time;
determining a first position corresponding to a greatest current magnitude of the plurality of current magnitudes;
determining a position detection value based on the greatest current magnitude and based on current magnitudes of the plurality of current magnitudes corresponding to positions that are adjacent to the first position; and
determining a position of the rotor at the standstill position based on the position detection value and an interpolation function.

9. The method of claim 8, wherein determining the position of the rotor comprises inputting the position detection value into the interpolation function that outputs an angular adjustment value, and wherein the position of the rotor is determined based on the angular adjustment value.

10. The method of claim 8, further comprising:
determining which of the first current magnitude through the sixth current magnitude is the greatest;
determining which two current magnitudes of the first current magnitude through the sixth current magnitude correspond to positions that are adjacent to the first position; and
determining which of the two current magnitudes is greatest and which is least.

11. The method of claim 10, wherein the interpolation function is linear, wherein determining the position of the rotor at the standstill position comprises inputting the position detection value into the interpolation function which outputs the position of the rotor relative to the first position.

12. The method of claim 11, wherein the position detection value is a constant, and wherein a range of the output of the interpolation function is between 0 and 30 degrees.

13. The method of claim 8, wherein providing a first current pulse of the plurality of current pulses to a first winding of the plurality of windings comprises applying a voltage across the first winding and across either a second winding or a third winding of the plurality of windings.

14. The method of claim 8, wherein providing a first current of the plurality of current pulses to a first winding of the plurality of windings comprises applying a voltage across the first winding, across a second winding, and across a third winding of the plurality of windings.

15. An apparatus comprising:
switching circuitry having a first output, a second output, and a third output;
metering circuitry having a first input coupled to the first output of the switching circuitry, a second input coupled to the second output of the switching circuitry, and a third input coupled to the third output of the switching circuitry, the metering circuitry configured to:
measure a first time for a first current to a first winding of a motor to reach a threshold;
measure a second time for a second current to a second winding of the motor to reach the threshold; and
measure a third time for a third current to a third winding of a motor to reach the threshold; and
rotor position detection circuitry coupled to the metering circuitry, and configured to:
determine a position of a rotor of the motor at standstill based on a shortest time of the first time, the second time, and the third time;
apply an interpolation function to the first time, the second time, and the third time to determine an adjustment value; and
adjust the determined position of the rotor based on the adjustment value.

16. The apparatus of claim 15, wherein the position of the rotor is an angular position of a first pole of the rotor that has a first magnetic polarity.

17. The apparatus of claim 15, wherein the rotor position detection circuitry is configured to determine a position detection value based on the shortest of the first time, the second time, and the third time, wherein the position detection value is an input of the interpolation function, and wherein the interpolation function outputs the position of the rotor based on the position detection value.

18. The apparatus of claim 15, wherein the rotor position detection circuitry is further configured to determine which of the first time, the second time, or the third time is shortest, and to determine the position of the rotor at standstill further based on an angle associated with the time determined to be the shortest.

19. The apparatus of claim 15, wherein the rotor position detection circuitry is configured to determine the position of the rotor at standstill based on a linear interpolation function.

* * * * *